United States Patent
Yen

(10) Patent No.: US 10,002,072 B2
(45) Date of Patent: Jun. 19, 2018

(54) METHOD AND APPARATUS FOR CONTROLLING DATA MIGRATION IN MULTI-CHANNEL MEMORY DEVICE

(71) Applicant: MEDIATEK INC., Hsin-Chu (TW)

(72) Inventor: Hsueh-Bing Yen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 297 days.

(21) Appl. No.: 14/736,261

(22) Filed: Jun. 10, 2015

(65) Prior Publication Data

US 2016/0342343 A1 Nov. 24, 2016

Related U.S. Application Data

(60) Provisional application No. 62/162,944, filed on May 18, 2015.

(51) Int. Cl.
*G06F 12/02* (2006.01)
*G06F 12/10* (2016.01)

(52) U.S. Cl.
CPC .............. *G06F 12/02* (2013.01); *G06F 12/10* (2013.01)

(58) Field of Classification Search
CPC ................................. G06F 12/02; G06F 12/10
See application file for complete search history.

(56) References Cited

U.S. PATENT DOCUMENTS

| | | | |
|---|---|---|---|
| 6,212,599 B1 | 4/2001 | Baweja | |
| 7,571,295 B2 | 8/2009 | Sakarda | |
| 8,380,940 B2 | 2/2013 | Wang | |
| 8,589,650 B2 | 11/2013 | Yokoya | |
| 2005/0154849 A1* | 7/2005 | Watanabe | G06F 3/0607 711/165 |
| 2005/0246508 A1* | 11/2005 | Shaw | G06F 12/0607 711/157 |
| 2008/0005516 A1 | 1/2008 | Meinschein | |
| 2009/0172270 A1 | 7/2009 | Kardach | |
| 2011/0296095 A1 | 12/2011 | Su | |

(Continued)

FOREIGN PATENT DOCUMENTS

| | | |
|---|---|---|
| WO | 2010070529 A2 | 6/2010 |
| WO | 2013110663 A1 | 8/2013 |

OTHER PUBLICATIONS

"International Search Report" dated Jun. 19, 2015 for International application No. PCT/CN2015/074222, International filing date Mar. 13, 2015.

(Continued)

*Primary Examiner* — Aracelis Ruiz
(74) *Attorney, Agent, or Firm* — Han IP Corporation; Andy M. Han

(57) ABSTRACT

A memory system has a memory device and a data migration control circuit. The memory device has a plurality of memory spaces accessed via a plurality of memory channels, respectively. The data migration control circuit controls a first stored data in a second memory space to migrate to a first memory space. When a first data piece of the first stored data is requested during data migration of the first data piece, the data migration control circuit blocks data access of the first data piece until the first data piece is fully stored into the first memory space, where a size of the first data piece is smaller than a size of the first stored data.

20 Claims, 12 Drawing Sheets

(56) References Cited

U.S. PATENT DOCUMENTS

2013/0268739 A1* 10/2013 Gupta ..................... G06F 3/065
                                                    711/162
2014/0047176 A1   2/2014 Poddar
2014/0201482 A1*  7/2014 Dudgeon .............. G06F 3/0647
                                                    711/162
2015/0012567 A1*  1/2015 Powell .............. G06F 17/30233
                                                    707/809
2015/0286427 A1* 10/2015 Akirav ................. G06F 3/0619
                                                    711/103

OTHER PUBLICATIONS

Chin-Wen Chang et al., Title: Method for Controlling Memory Device to Achieve More Power Saving and Related Apparatus Thereof, pending U.S. Appl. No. 14/784,037, filed Oct. 13, 2015.

* cited by examiner (A)

(B)

METHOD AND APPARATUS FOR CONTROLLING DATA MIGRATION IN MULTI-CHANNEL MEMORY DEVICE

CROSS REFERENCE TO RELATED APPLICATIONS

This application claims the benefit of U.S. provisional application No. 62/162,944, filed on May 18, 2015 and incorporated herein by reference.

BACKGROUND

The disclosed embodiments of the present invention relate to accessing a memory device, and more particularly, to a method and apparatus for controlling data migration in a multi-channel memory device to achieve power saving.

Computer technology continues to advance at a remarkable pace, with numerous improvements being made to the performance of both of the processor system and the memory system in a computer system. For example, in response to demands for faster, more efficient computer systems, the processor system may be designed to have higher computing power and operate more quickly for dealing with more tasks. If the operating capability of the memory system fails to meet the bandwidth requirement, the memory system would become a performance bottleneck. Hence, attention has been directed to increasing throughput of the memory system.

A multi-channel memory device may be employed to meet the bandwidth requirement. Taking a dual-channel memory device for example, it has two parallel memory channels operating simultaneously to thereby offer larger data throughput. When the number of memory channels used in the multi-channel memory device is larger, it means the power consumption is higher. Further, the computer system does not always need a large memory bandwidth. When the multi-channel memory device has all of its memory channels active under a condition that the computer system only needs a smaller memory bandwidth, the power utilization may not be optimized. If the computer system is a portable device (e.g., a smartphone) powered by a battery device, the battery life may be shortened due to increased power consumption of the memory system. Thus, there is a need for an innovative design which can effectively reduce the power consumption of the multi-channel memory device.

SUMMARY

In accordance with exemplary embodiments of the present invention, a method and apparatus for controlling data migration in a multi-channel memory device to achieve power saving are proposed.

According to a first aspect of the present invention, an exemplary memory system is disclosed. The exemplary memory system includes a memory device and a data migration control circuit. The memory device has a plurality of memory spaces accessed via a plurality of memory channels, respectively. The data migration control circuit is configured to control a first stored data in a second memory space of the memory spaces to migrate to a first memory space of the memory spaces. When a first data piece of the first stored data is requested during data migration of the first data piece, the data migration control circuit is further configured to block data access of the first data piece until the first data piece is fully stored into the first memory space, where a size of the first data piece is smaller than a size of the first stored data.

According to a second aspect of the present invention, an exemplary method for managing a memory device is disclosed. The memory device has a plurality of memory spaces accessed via a plurality of memory channels, respectively. The exemplary method includes: controlling a first stored data in a second memory space of the memory spaces to migrate to a first memory space of the memory spaces; and when a first data piece of the first stored data is requested during data migration of the first data piece, blocking data access of the first data piece until the first data piece is fully stored into the first memory space, wherein a size of the first data piece is smaller than a size of the first stored data.

According to a third aspect of the present invention, another exemplary memory system is disclosed. The exemplary memory system includes a memory device and a data migration control circuit. The memory device has a plurality of memory spaces accessed via a plurality of memory channels, respectively. The data migration control circuit is configured to detect if the memory device is switched from a first bandwidth scenario to a second bandwidth scenario, and is further configured to control a first stored data in a second memory space of the memory spaces to migrate to a first memory space of the memory spaces when detecting that the memory device is switched from the first bandwidth scenario to the second bandwidth scenario, wherein the first bandwidth scenario and the second bandwidth scenario have different memory bandwidth requirements.

According to a fourth aspect of the present invention, another exemplary method for managing a memory device is disclosed. The memory device has a plurality of memory spaces accessed via a plurality of memory channels, respectively. The exemplary method includes: detecting if the memory device is switched from a first bandwidth scenario to a second bandwidth scenario, wherein the first bandwidth scenario and the second bandwidth scenario have different memory bandwidth requirements; and when detecting that the memory device is switched from the first bandwidth scenario to the second bandwidth scenario, controlling a first stored data in a second memory space of the memory spaces to migrate to a first memory space of the memory spaces.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes a memory system design which can dynamically change the number of active memory channels used in a multi-channel memory device without degrading the user experience of using a computer system. For example, dynamic channel switching may be performed without user-aware data migration latency. In some embodiments, the change of number of active memory channels can be performed non-dynamically. The data migration may be performed to make stored data migrated from a second memory space of a second memory channel to a first memory space of a first memory channel. If the second memory space has no valid data after the data migration is accomplished, the second memory channel and/or associated memory controller may be powered down for power saving. Further, the number of memory channels active at the same time may be reduced after the data migration is accomplished. Hence, the memory controllers do not need to control data access via all of the memory channels simultaneously. The power consumption can be reduced correspondingly. Moreover, the stored data may be divided into a plurality of data pieces, and the data pieces may be transferred from the second memory space to the first memory space one by one. When a data piece currently being migrated is requested by a hardware module, the data piece is accessible after stored into the first memory space. Hence, the access latency resulting from waiting for completion of data migration of one data piece (which is part of the stored data to be migrated) may be much shorter than the access latency resulting from waiting for completion of data migration of all of the stored data. In this way, the user of the computer system may not easily perceive the system response delay caused by the access latency of one requested data piece. Further details of the proposed memory system design are described as below.

Figure 1:
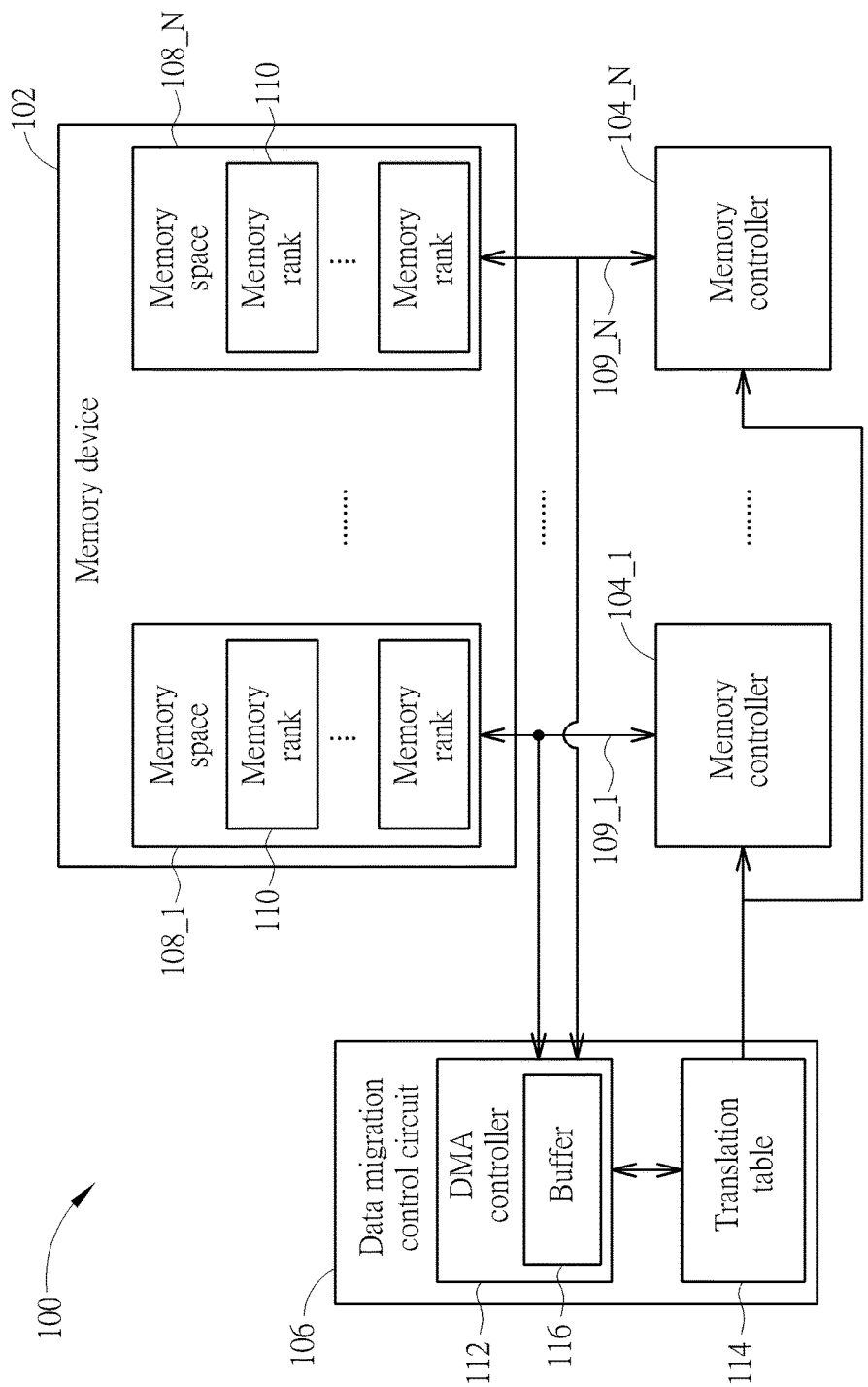
FIG. 1 is a block diagram illustrating a memory system according to an embodiment of the present invention.

FIG. 1 is a block diagram illustrating a memory system according to an embodiment of the present invention. The memory system 100 may be part of a computer system. For example, the memory system 100 may be implemented in a portable device, such as a tablet, a smartphone, or a wearable device. The memory system 100 may include a memory device (e.g., a dynamic random access memory) 102, a plurality of memory controllers 104_1-104_N, and a data migration control circuit 106, where N may be any positive number not smaller than two. In this embodiment, the memory device 102 may be a multi-channel memory having a plurality of memory spaces 108_1-108_N accessed via a plurality of memory channels 109_1-109_N, respectively. The memory controllers 104_1-104_N may be configured to control data access (i.e., read and write) of the memory spaces 108_1-108_N, respectively. Hence, the number of memory controllers 104_1-104_N may be equal to the number of memory spaces 108_1-108_N, and may also be equal to the number of memory channels 109_1-109_N. It should be noted that the value of N may be adjusted, depending upon actual design consideration. For example, when N=2, a dual-channel memory may be used to realize the memory device 102. For another example, when N=4, a quad-channel memory may be used to realize the memory device 102. Each of the memory spaces 108_1-108_N may have one or more memory ranks 110 controlled by the same chip select (CS) signal, and each memory rank 110 may include one or more memory dies/chips.

When, for example, the computer system enters a suspend/standby mode or the memory device 102 is switched from a higher bandwidth scenario (e.g., video playback, gaming, etc.) to a lower bandwidth scenario (e.g., text editing, web surfing, etc.), the proposed data migration scheme may be enabled for allowing the memory device 102 to have lower power consumption. However, when the computer system leaves the suspend/standby mode or the memory device 102 is switched from the lower bandwidth scenario to the higher bandwidth scenario, an inverse operation of the proposed data migration scheme may be enabled for allowing the memory device 102 to meet a higher bandwidth requirement.

By way of example, but not limitation, the data migration control circuit 106 may detect if the memory device 102 is switched from a first bandwidth scenario to a second bandwidth scenario, and may control a first stored data in a second memory space of the memory spaces 108_1-108_N to migrate to a first memory space of the memory spaces 108_1-108_N when detecting that the memory device 102 is switched from the first bandwidth scenario to the second bandwidth scenario, where the first bandwidth scenario and the second bandwidth scenario have different memory bandwidth requirements.

Data migration between different memory channels of the memory device 102 may be managed by the data migration control circuit 106. In this embodiment, the data migration control circuit 106 may include a direct memory access (DMA) controller 112 and a translation table 114. The DMA controller 112 may control data migration of stored data in a DMA manner. The data migration may copy/move stored data from a second memory space of a second memory channel to a first memory space of a first memory channel, and/or may swap stored data in a second memory space of a second memory channel and stored data in a first memory space of a first memory channel. That is, the data migration may be a one-way data transfer, a two-way data transfer or a combination thereof. When the data migration is performed to achieve data swapping, a buffer 116 in the DMA controller 112 may be used to temporarily keep the stored data read from the first memory space before the DMA controller 112 writes the stored data of the second memory space into the first memory space. Hence, after at least a portion (i.e., part or all) of the stored data in the first memory space is overwritten by at least a portion of the stored data in the second memory space, the DMA controller 112 may start retrieving at least a portion (i.e., part or all) of data from the buffer 116 and writing the retrieved data into the second memory space to overwrite at least the portion of the stored data in the second memory space that is already stored into the first memory space. The buffer 116 may be implemented using a small-sized storage component. For example, the size of the buffer 116 may be equal to a data piece size.

The translation table 114 may be configured to record the mapping between the original memory addresses and the new memory addresses. Hence, though the stored data may be migrated to a different storage location which is not known by an external hardware module such as a memory management unit (MMU), the stored data can be correctly accessed through the translation table 114. For example, the translation table 114 may translate one physical address generated from the MMU into another physical address at which the requested data is actually stored. In one example, the DMA controller may be configured to instruct the translation table 114 to record the mapping. In another example, the DMA controller may instruct the translation table 114 to record the mapping after stored data is transferred from original memory addresses to new memory addresses. For better understanding of technical features of the present invention, several data migration examples are detailed as below.

Figure 2:
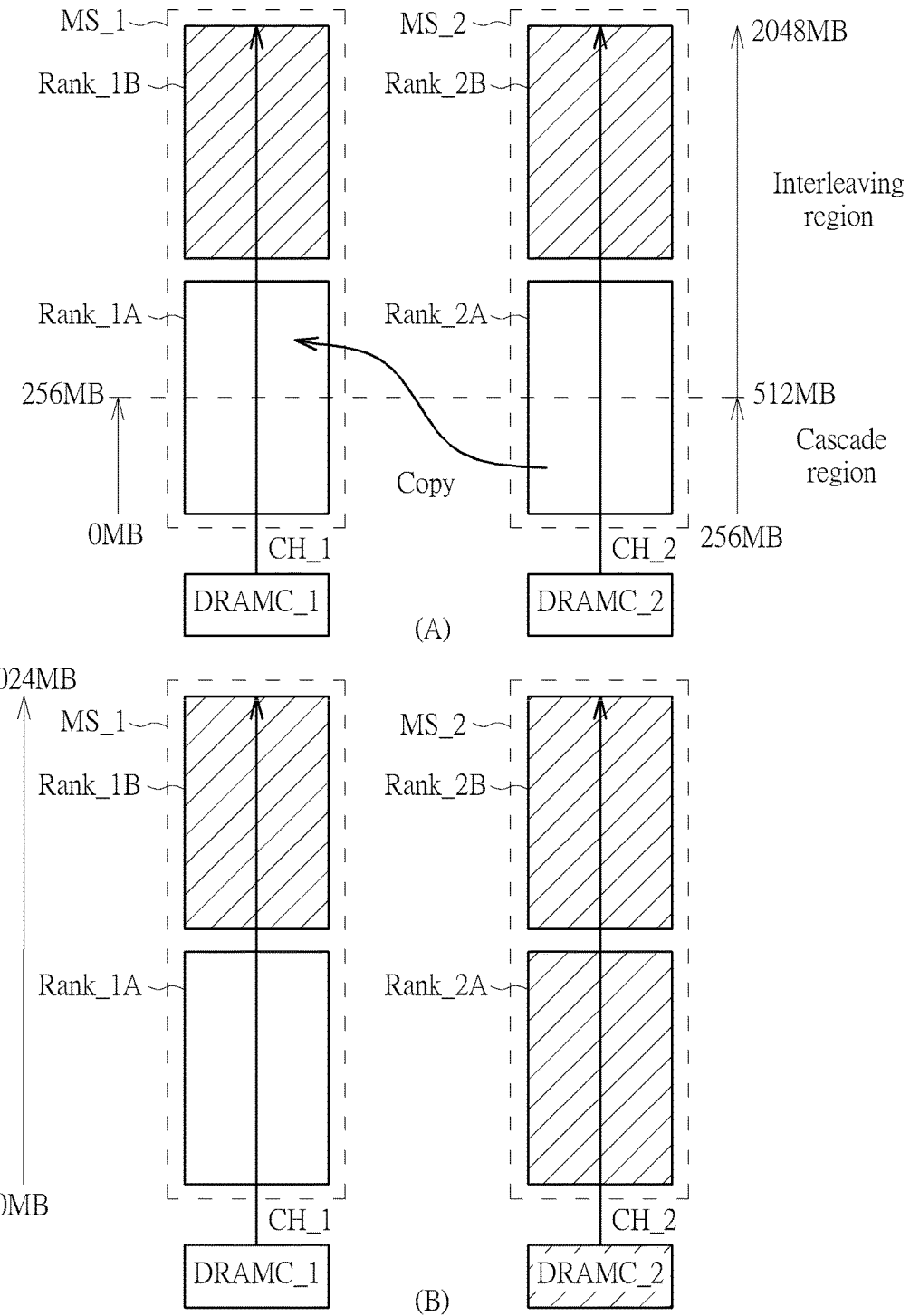
FIG. 2 is a diagram illustrating a data migration in a memory device according to a first embodiment of the present invention.

FIG. 2 is a diagram illustrating a data migration in a memory device according to a first embodiment of the present invention. Suppose that the memory device 102 may be a dual-channel memory. Hence, there may be two memory spaces 108_1-108_N (N=2) denoted by MS_1 and MS_2, two memory channels 109_1-109_N (N=2) denoted by CH_1 and CH_2, and two memory controllers 104_1-104_N (N=2) denoted by DRAMC_1 and DRAMC_2. In this example, the memory space MS_1 may have an upper memory rank Rank_1B and a lower memory rank Rank_1A, and the memory space MS_2 may also have an upper memory rank Rank_2B and a lower memory rank Rank_2A. Further, addresses assigned to an upper memory rank in a memory space may be higher than addresses assigned to a lower memory rank in the same memory space.

As shown in sub-diagram (A) of FIG. 2, the whole memory device 102 may be partitioned into an interleaving region for high performance usage and a cascade region for low power usage. When the memory device 102 is used under a low power and lower bandwidth scenario, the cascade region may be allocated in a lower part of the lower memory rank Rank_1A and a lower part of the lower memory rank Rank_2A, where the lower part of the lower memory rank Rank_1A may be cascaded by the lower part of the lower memory rank Rank_2A to thereby define a region with continuous memory addresses. Lower memory addresses of the cascade region may be assigned to the lower part of the lower memory rank Rank_1A, and higher memory addresses may be assigned to the lower part of the lower memory rank Rank_2A. In this example, the size of the lower part of the lower memory rank Rank_1A may be 256 MB (megabytes), and the size of the lower part of the lower memory rank Rank_2A may be 256 MB. Hence, the size of the cascade region may be 512 MB (i.e., 256 MB+256 MB). It should be noted that allocation of the cascade region in the memory device 102 is for illustrative purposes only, and is not meant to be a limitation of the present invention. For example, the size of the cascade region may be adjusted, depending upon actual design consideration.

In a low power and lower bandwidth scenario, the memory controllers DRAMC_1 and DRAMC_2 may control data access of the cascade region (i.e., lower part of the lower memory rank Rank_1A and lower part of the lower memory rank Rank_2A) under a cascade memory access mode. That is, concerning each memory address of a read request or write request, only one of the memory channels CH_1 and CH_2 may be active at a time for reading data from the cascade region or writing data into the cascade region. Hence, not all of the memory channels CH_1 and CH_2 are required to be active at the same time under a cascade memory access mode.

The interleaving region may be allocated in a higher part of the lower memory rank Rank_1A, a higher part of the lower memory rank Rank_2A, and the upper memory ranks Rank_1B and Rank_2B. In a high performance and higher bandwidth scenario, the memory controllers DRAMC_1 and DRAMC_2 may control data access of the interleaving region (i.e., higher part of the lower memory rank Rank_1A, higher part of the lower memory rank Rank_2A, and upper memory ranks Rank_1B and Rank_2B) under an interleaving memory access mode. That is, both of the memory channels CH_1 and CH_2 may be active at the same time for reading/writing data at a memory address. Hence, the higher part of the lower memory rank Rank_1A and the higher part of the lower memory rank Rank_2A may be accessed by the memory controllers DRAMC_1 and DRAMC_2 in a parallel manner, and the upper memory ranks Rank_1B and Rank_2B may also be accessed by the memory controllers DRAMC_1 and DRAMC_2 in a parallel manner. It should be noted that allocation of the interleaving region in the memory device 102 is for illustrative purposes only, and is not meant to be a limitation of the present invention. For example, the size of the interleaving region may be adjusted, depending upon actual design consideration.

In a case where the upper memory ranks Rank_1B and Rank_2B do not store valid data, each of the upper memory ranks Rank_1B and Rank_2B may disable its self-refresh operation and enter a lowest possible power state such as a Deep Power Down (DPD) state, as shown in sub-diagram (A) of FIG. 2. For example, all valid data in the upper memory rank Rank_1B may be transferred to the lower memory rank Rank_1A, and all valid data in the upper memory rank Rank_2B may be transferred to the lower memory rank Rank_2A. Next, each of the upper memory ranks Rank_1B and Rank_2B may enter the DPD state for power saving.

As shown in the sub-diagram (A) of FIG. 2, the upper part of the lower memory rank Rank_1A may be allocated to be a portion of the interleaving region, and the lower part of the lower memory rank Rank_2A may be allocated to be a portion of the cascade region. Consider a case where the upper part of the lower memory rank Rank_1A has enough free spaces for accommodating all valid data in the lower part of the lower memory rank Rank_2A while the memory device 102 operates in the low bandwidth scenario or the computer system enters a suspend/standby mode, the proposed data migration scheme may be enabled to copy/move all valid data in the lower part of the lower memory rank Rank_2A to the upper part of the lower memory rank Rank_1A.

Figure 3:
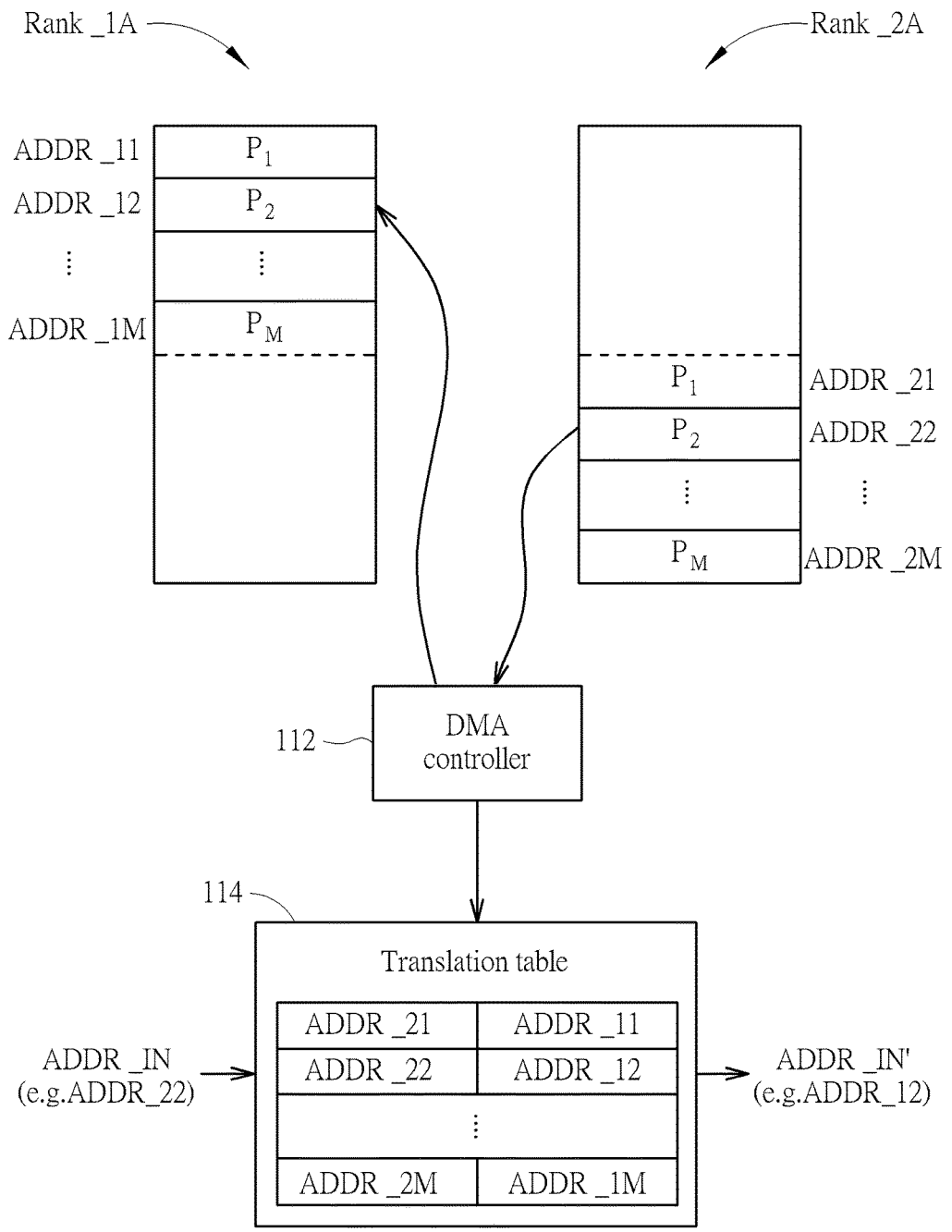
FIG. 3 is a diagram illustrating a copy/move operation performed by the data migration control circuit shown in FIG. 1 according to an embodiment of the present invention.

FIG. 3 is a diagram illustrating a copy/move operation performed by the data migration control circuit 106 shown in FIG. 1 according to an embodiment of the present invention. The DMA controller 112 may partition the valid data stored in the lower part of the lower memory rank Rank_2A into a plurality of data pieces, and transfer the data pieces to free spaces in the upper part of the lower memory rank Rank_1A one by one. The size of each data piece may be smaller than the size of stored data to be migrated. For example, the data piece size may be 1 KB (kilobytes), 4 KB, 1 MB, 4 MB, or other pre-defined/user-defined value.

In this example, the valid data stored in the lower part of the lower memory rank Rank_2A may be partitioned into data pieces $P_1$-$P_M$ with piece addresses ADDR_21-ADDR_2M, respectively. Since the upper part of the lower memory rank Rank_1A has enough free spaces for accommodating all of the valid data in the lower part of the lower memory rank Rank_2A, the DMA controller 112 may transfer each of the data pieces $P_1$-$P_M$ to any free space available in the upper part of the lower memory rank Rank_1A. By way of example, but not limitation, the upper part of the lower memory rank Rank_1A has no valid data. Hence, the DMA controller 112 may transfer the data pieces $P_1$-$P_M$ to sequential free spaces in the upper part of the lower memory rank Rank_1A. As shown in FIG. 3, the DMA controller 112 may transfer the data piece $P_1$ at the piece address ADDR_21 in the lower part of the lower memory rank Rank_2A to the piece address ADDR_11 in the upper part of the lower memory rank Rank_1A. The translation table 114 may be configured to record/update the mapping between the original piece address ADDR_21 of the data piece $P_1$ and the new piece address ADDR_11 of the data piece $P_1$. In one example, the DMA controller 112 may instruct the translation table 114 to record/update the mapping when data migration of the data piece $P_1$ is accomplished.

Next, the DMA controller 112 may transfer the data piece $P_2$ at the piece address ADDR_22 in the lower part of the lower memory rank Rank_2A to the piece address ADDR_12 in the upper part of the lower memory rank Rank_1A. Similarly, the translation table 114 may be configured to record/update the mapping between the original piece address ADDR_22 of the data piece $P_2$ and the new piece address ADDR_12 of the data piece $P_2$. In one example, the DMA controller 112 may instruct the translation table 114 to record/update the mapping when the data migration of the data piece $P_2$ is accomplished. The DMA controller 112 may keep transferring the remaining data pieces from the lower part of the lower memory rank Rank_2A to the upper part of the lower memory rank Rank_1A until data migration of the last data piece $P_M$ is accomplished. After the data migration of the last data piece $P_M$ is accomplished, the translation table 114 may have a plurality of table entries that record mapping between piece addresses ADDR_21-ADDR_2M of the data pieces $P_1$-$P_M$ in the lower part of the lower memory rank Rank_2A and piece addresses ADDR_11-ADDR_1M of the data pieces $P_1$-$P_M$ in the upper part of the lower memory rank Rank_1A.

It should be noted that, while the DMA controller 112 is transferring a specific data piece from the lower part of the lower memory rank Rank_2A to the upper part of the lower memory rank Rank_1A, any access request for the specific data piece may be temporarily blocked to ensure data integrity. For example, the external hardware module (e.g., MMU) may issue an access request with a physical address for accessing one target data in the memory device 102. Supposing that the data piece $P_2$ may be requested during data migration of the data piece $P_2$, the data access of the data piece $P_2$ may be blocked by the data migration control circuit 106 until the data piece $P_2$ is fully stored into a free space at the piece address ADDR_12 of the upper part of the lower memory rank Rank_1A.

In this embodiment, the translation table 114 may receive an input physical address ADDR_IN generated from an external hardware module (e.g., MMU), and respond with an output physical address ADDR_IN' and then transmit the output physical address ADDR_IN' to at least one of the memory controllers 104_1-104_N. In a case where the translation table 114 receives a physical address ADDR_22 issued for accessing the data piece $P_2$ in the lower part of the lower memory rank Rank_2A during data migration of the data piece $P_2$ (i.e., ADDR_IN=ADDR_22), the translation table 114 may not respond with a physical address ADDR_12 of the data piece $P_2$ in the upper part of the lower memory rank Rank_1A until the data piece $P_2$ is fully stored into the upper part of the lower memory rank Rank_1A by the DMA controller 112. That is, the translation table 114 may postpone the physical address translation ADDR_22-ADDR_12 to wait for completion of data migration of the requested data piece $P_2$. After the memory controller 104_1 receives the output physical address ADDR_IN'=ADDR_12 generated from the translation table 114, the memory controller 104_1 may access the requested data piece $P_2$ in the upper part of the lower memory rank Rank_1A in response to the data access request issued from the external hardware module.

In another case where the translation table 114 receives a physical address ADDR_21 issued for accessing the data piece $P_1$ in the lower part of the lower memory rank Rank_2A after the data migration of the data piece $P_1$ is already done (i.e., ADDR_IN=ADDR_21), the translation table 114 may not need to postpone the physical address translation ADDR_21→ADDR_11, and therefore responds with a physical address ADDR_11 of the data piece $P_1$ in the upper part of the lower memory rank Rank_1A (i.e., ADDR_IN'=ADDR_11). After the memory controller 104_1 receives the output physical address ADDR_IN' generated from the translation table 114, the memory controller 104_1 may access the requested data piece $P_1$ in the upper part of the lower memory rank Rank_1A in response to the data access request issued from the external hardware module.

In yet another case where the translation table 114 receives a physical address ADDR_2M issued for accessing the data piece $P_M$ in the lower part of the lower memory rank Rank_2A before the data migration of the data piece $P_M$ is started (i.e., ADDR_IN=ADDR_2M), the translation table 114 may not need to do any physical address translation, and therefore responds with the bypassed physical address ADDR_2M (i.e., ADDR_IN'=ADDR_2M). After the memory controller 104_N (N=2) receives the output physical address ADDR_IN' generated from the translation table 114, the memory controller 104_N may access the requested data piece $P_M$ in the lower part of the lower memory rank Rank_2A in response to the data access request issued from the external hardware module.

Suppose that the upper part of the lower memory rank Rank_2A has no valid data stored therein. After the stored data in the lower part of the lower memory rank Rank_2A is stored into the upper part of the lower memory rank Rank_1A, the lower memory rank Rank_2A may disable its self-refresh operation and enter the DPD state for power saving, as shown in sub-diagram (B) of FIG. 2. Since all of the memory ranks Rank_2A and Rank_2B in the same memory channel CH_2 are in the DPD state, the memory controller DRAMC_2 may be powered down to save more power. The proposed data migration scheme may achieve dynamic channel switching in the memory device 102, thereby enabling the memory device 102 to get the chance of forcing more memory ranks to enter the DPD state. In some embodiments, the channel switching can be done non-dynamically.

It should be noted that the latency resulting from the data access blockage may depend on the data piece size. When the data piece size is set by a smaller value, the data access latency caused by the proposed data migration enabled for power saving may be less significant. When the data piece size is properly set, the objective of reducing power consumption of the memory device can be achieved without having a great impact on the user experience of using the computer system. Hence, dynamic channel switching may be achieved without user-aware migration latency.

The data migration example shown in FIG. 3 is for illustrative purposes only, and is not meant to be a limitation of the present invention. In an alternative design, the order of data pieces $P_1$-$P_M$ arranged in the lower part of the lower memory rank Rank_2A may be different from the order of data pieces $P_1$-$P_M$ arranged in the upper part of the lower memory rank Rank_1A. Further, the size and/or the number of data pieces $P_1$-$P_M$ may be adjusted, depending upon the actual design consideration.

In the above example, the DMA controller 122 of the data migration control circuit 106 may perform data migration to copy/move stored data in the memory space MS_2 to the another memory space MS_1 because the upper part of the lower memory rank Rank_1A may have enough free spaces for accommodating all valid data in the lower part of the lower memory rank Rank_2A (or the upper part of the lower memory rank Rank_1A is not occupied by any valid data). Consider another case where the memory device 102 may operate in a low bandwidth scenario and an upper part of the lower memory rank Rank_1A may not have enough free spaces for accommodating all of the valid data in the lower part of the lower memory rank Rank_2A (or the upper part of the lower memory rank Rank_1A is occupied by valid data), the proposed data migration scheme may be enabled to swap valid data stored in the lower part of the lower memory rank Rank_2A and valid data stored in the upper part of the lower memory rank Rank_1A.

Figure 4:
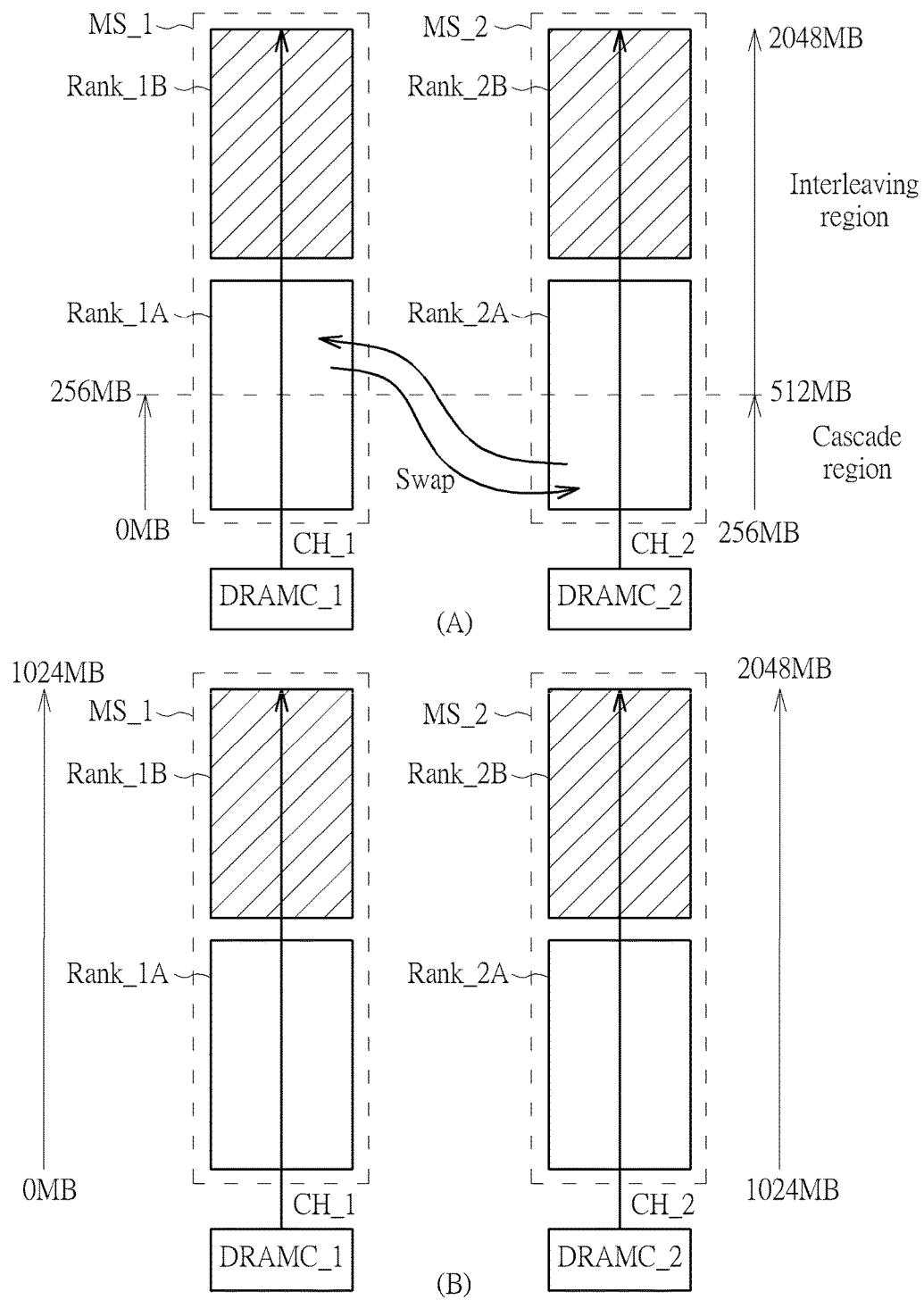
FIG. 4 is a diagram illustrating a data migration in a memory device according to a second embodiment of the present invention.
Figure 5:
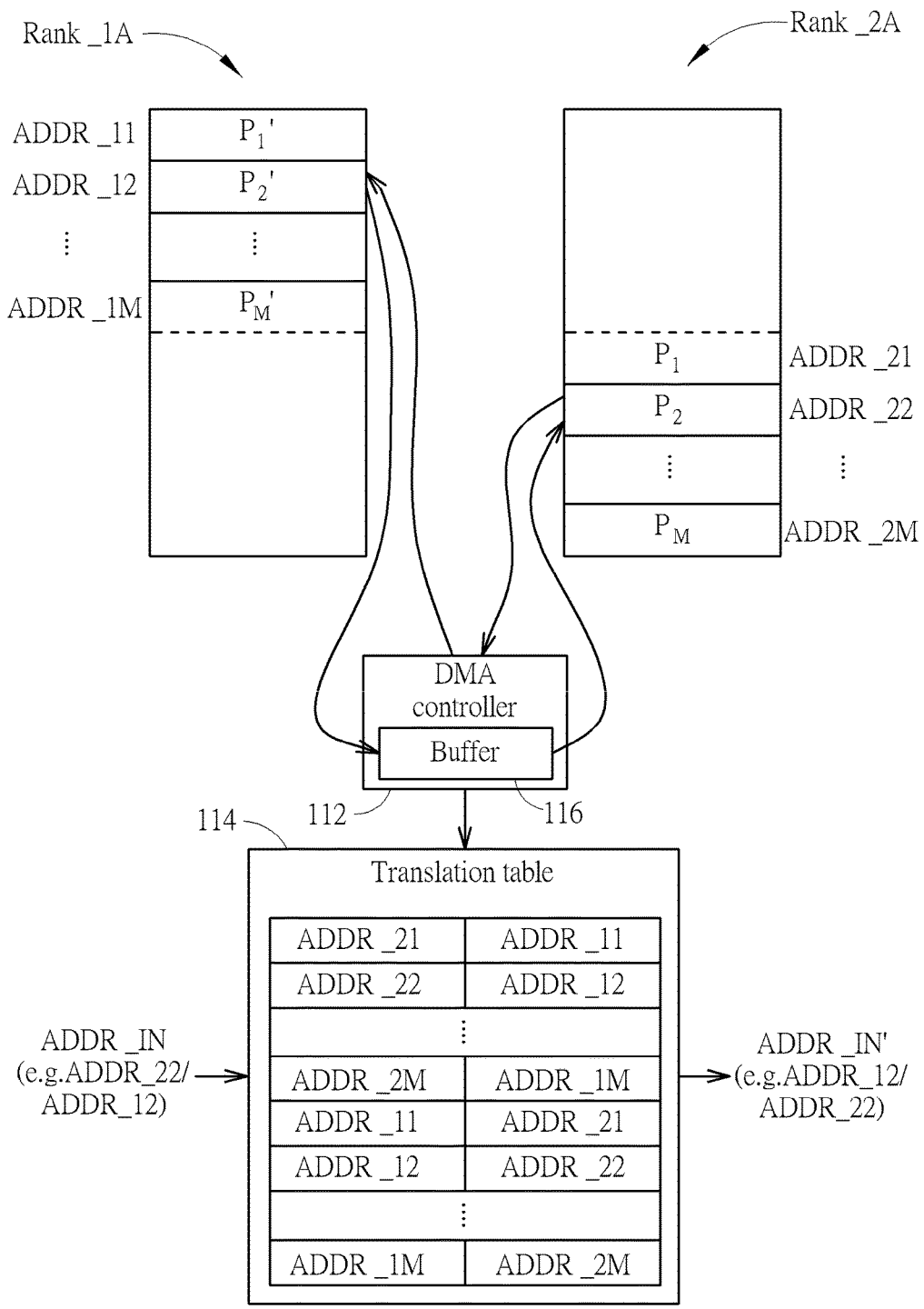
FIG. 5 is a diagram illustrating a swap operation performed by the data migration control circuit shown in FIG. 1 according to an embodiment of the present invention.

Please refer to FIG. 4 in conjunction with FIG. 5. FIG. 4 is a diagram illustrating a data migration in a memory device according to a second embodiment of the present invention. FIG. 5 is a diagram illustrating a swap operation performed by the data migration control circuit 106 shown in FIG. 1 according to an embodiment of the present invention. The DMA controller 112 may partition the valid data stored in the lower part of the lower memory rank Rank_2A into a plurality of data pieces, partition the valid data stored in the upper part of the lower memory rank Rank_1A into a plurality of data pieces, and swap stored data in the upper part of the lower memory rank Rank_1A and the lower part of the lower memory rank Rank_2A by data piece transaction. Suppose that the size of valid data stored in the upper part of the lower memory rank Rank_1A may be equal to the size of valid data stored in the lower part of the lower memory rank Rank_2A, and the same data piece size may be used for partitioning stored data to be migrated. As shown in FIG. 5, the valid data stored in the lower part of the lower memory rank Rank_2A may be partitioned into data pieces $P_1$-$P_M$ with piece addresses ADDR_21-ADDR_2M, respectively; and the valid data stored in the upper part of the lower memory rank Rank_1A may be partitioned into data pieces $P_1'$-$P_M'$ with piece addresses ADDR_11-ADDR_1M, respectively. For example, the data piece size may be 1 KB, 4 KB, 1 MB, 4 MB, or other pre-defined/user-defined value.

Since the upper part of the lower memory rank Rank_1A is occupied by the data pieces $P_1'$-$P_M'$, the DMA controller 112 may need to perform the swap operation to avoid losing stored data in the upper part of the lower memory rank Rank_1A after data migration of stored data in the lower part of the lower memory rank Rank_2A is performed. Hence, the swap operation may transfer the data pieces $P_1$-$P_M$ to the upper part of the lower memory rank Rank_1A and transfer the data pieces $P_1'$-$P_M'$ to the lower part of the lower memory rank Rank_2A. By way of example, but not limitation, the DMA controller 112 may transfer the data pieces $P_1$-$P_M$ to sequential piece addresses in the upper part of the lower memory rank Rank_1A, and transfer the data pieces $P_1'$-$P_M'$ to sequential piece addresses in the lower part of the lower memory rank Rank_2A.

As shown in FIG. 5, the DMA controller 112 may transfer the data piece $P_1'$ at the piece address ADDR_11 to the buffer 116, transfer the data piece $P_1$ at the piece address ADDR_21 to the piece address ADDR_11, and transfer the data piece $P_1'$ stored in the buffer 116 to the piece address ADDR_21. Alternatively, the DMA controller 112 may transfer the data piece $P_1$ at the piece address ADDR_21 to the buffer 116, transfer the data piece $P_1'$ at the piece address ADDR_11 to the piece address ADDR_21, and transfer the data piece $P_1$ stored in the buffer 116 to the piece address ADDR_11. The same objective of swapping the data pieces $P_1$ and $P_1'$ is achieved. The translation table 114 may be configured to record/update the mapping between the original piece address ADDR_21 of the data piece $P_1$ and the new piece address ADDR_11 of the data piece $P_1$. In one example, the DMA controller 112 may instruct the translation table 114 to record/update the mapping when data migration of the data piece $P_1$ is accomplished. Similarly, the translation table 114 may be configured to record/update the mapping between the original piece address ADDR_11 of the data piece $P_1'$ and the new piece address ADDR_21 of the data piece $P_1'$. In one example, the DMA controller 112 may instruct the translation table 114 to record/update the mapping when data migration of the data piece $P_1'$ is accomplished.

Next, the DMA controller 112 may transfer the data piece $P_2'$ at the piece address ADDR_12 to the buffer 116, transfer the data piece $P_2$ at the piece address ADDR_22 to the piece address ADDR_12, and transfer the data piece $P_2'$ stored in the buffer 116 to the piece address ADDR_22. Alternatively, the DMA controller 112 may transfer the data piece $P_2$ at the piece address ADDR_22 to the buffer 116, transfer the data piece $P_2'$ at the piece address ADDR_12 to the piece address ADDR_22, and transfer the data piece $P_2$ stored in the buffer 116 to the piece address ADDR_12. The same objective of swapping the data pieces $P_2$ and $P_2'$ is achieved. The translation table 114 may be configured to record/update the mapping between the original piece address ADDR_22 of the data piece $P_2$ and the new piece address ADDR_12 of the data piece $P_2$. In one example, the DMA controller 112 may instruct the translation table 114 to record/update the mapping when data migration of the data piece $P_2$ is accomplished. Similarly, the translation table 114 may be configured to record/update the mapping between the original piece address ADDR_12 of the data piece $P_2'$ and the new piece address ADDR_22 of the data piece $P_2'$. In one example, the DMA controller 112 may instruct the translation table 114 to record/update the mapping when data migration of the data piece $P_2'$ is accomplished.

The DMA controller 112 may keep transferring the following data pieces from the lower part of the lower memory rank Rank_2A to the upper part of the lower memory rank Rank_1A until the data migration of the last data piece $P_M$ is accomplished. In addition, the DMA controller 112 may keep transferring the following data pieces from the upper part of the lower memory rank Rank_1A to the lower part of the lower memory rank Rank_2A until the data migration of the last data piece $P_M'$ is accomplished.

After data migrations of the last data pieces $P_M$ and $P_M'$ are accomplished, the translation table 114 may have a plurality of table entries that record mapping between piece addresses ADDR_21-ADDR_2M of the data pieces $P_1$-$P_M$ in the lower part of the lower memory rank Rank_2A and piece addresses ADDR_11-ADDR_1M of the data pieces $P_1$-$P_M$ in the upper part of the lower memory rank Rank_1A, and may further have a plurality of table entries that record mapping between piece addresses ADDR_11-ADDR_1M of the data pieces $P_1'$-$P_M'$ in the upper part of the lower memory rank Rank_1A and piece addresses ADDR_21-ADDR_2M of the data pieces $P_1'$-$P_M'$ in the lower part of the lower memory rank Rank_2A.

It should be noted that, while the DMA controller 112 is transferring a specific data piece from one memory rank to another memory rank, any access request for the specific data piece may be temporarily blocked to ensure data integrity. For example, the external hardware module (e.g., MMU) may issue an access request with a physical address for accessing a target data in the memory device 102. Supposing that the data piece $P_2$ (or $P_2'$) may be requested during data migration of the data piece $P_2$ (or $P_2'$), the data access of the data piece $P_2$ (or $P_2'$) may be blocked until the data piece $P_2$ (or $P_2'$) is fully stored to the piece address ADDR_12 (or ADDR_22).

In this embodiment, the translation table 114 may receive an input physical address ADDR_IN generated from the external hardware module, and respond with an output physical address ADDR_IN' and transmit the output physical address ADDR_IN' to at least one of the memory controllers 104_1-104_N. In a case where the translation table 114 receives a physical address ADDR_22 issued for accessing the data piece $P_2$ in the lower part of the lower memory rank Rank_2A during the data migration of the data piece $P_2$ (i.e., ADDR_IN=ADDR_22), the translation table 114 may not respond with a physical address ADDR_12 of the data piece $P_2$ in the upper part of the lower memory rank Rank_1A until the data piece $P_2$ is fully stored into the upper part of the lower memory rank Rank_1A. After the memory controller 104_1 receives the output physical address ADDR_IN'=ADDR_12, the memory controller 104_1 may access the data piece $P_2$ in the upper part of the lower memory rank Rank_1A in response to the data access request issued from the external hardware module. Similarly, if the translation table 114 receives a physical address ADDR_12 issued for accessing the data piece $P_2'$ in the upper part of the lower memory rank Rank_1A during the data migration of the data piece $P_2'$ (i.e., ADDR_IN=ADDR_12), the translation table 114 may not respond with a physical address ADDR_22 of the data piece $P_2'$ in the lower part of the lower memory rank Rank_2A until the data piece $P_2'$ is fully stored into the lower part of the lower memory rank Rank_2A. After the memory controller 104_N (N=2) receives the output physical address ADDR_IN'=ADDR_22, the memory controller 104_N may access the data piece $P_2'$ in the lower part of the lower memory rank Rank_2A in response to the data access request issued from the external hardware module.

In another case where the translation table 114 receives a physical address ADDR_21 issued for accessing the data piece $P_1$ in the lower part of the lower memory rank Rank_2A after the data migration of the data piece $P_1$ is already done (i.e., ADDR_IN=ADDR_21) the translation table 114 may not need to postpone the physical address translation ADDR_21→ADDR_11, and therefore responds with a physical address ADDR_11 of the data piece $P_1$ in the upper part of the lower memory rank Rank_1A (i.e., ADDR_IN'=ADDR_11). After the memory controller 104_1 receives the output physical address ADDR_IN', the memory controller 104_1 may access the data piece $P_1$ in the upper part of the lower memory rank Rank_1A in response to the data access request issued from the external hardware module. Similarly, if the translation table 114 receives a physical address ADDR_11 issued for accessing the data piece $P_1'$ in the upper part of the lower memory rank Rank_1A after the data migration of the data piece $P_1'$ is already done (i.e., ADDR_IN=ADDR_11), the translation table 114 may not need to postpone the physical address translation ADDR_11→ADDR_21, and therefore responds with a physical address ADDR_21 of the data piece $P_1'$ in the lower part of the lower memory rank Rank_2A (i.e., ADDR_IN'=ADDR_21). After the memory controller 104_N (N=2) receives the output physical address ADDR_IN', the memory controller 104_N may access the data piece $P_1'$ in the lower part of the lower memory rank Rank_2A in response to the data access request issued from the external hardware module In yet another case where the translation table 114 receives a physical address ADDR_2M issued for accessing the data piece $P_M$ in the lower part of the lower memory rank Rank_2A before the data migration of the data piece $P_M$ is started (i.e., ADDR_IN=ADDR_2M), the translation table 114 may not need to do any physical address translation, and therefore responds with the bypassed physical address ADDR_2M (i.e., ADDR_IN'=ADDR_2M). After the memory controller 104_N (N=2) receives the output physical address ADDR_IN', the memory controller 104_N may access the data piece $P_M$ in the lower part of the lower memory rank Rank_2A in response to the data access request issued from the external hardware module. Similarly, if the translation table 114 receives a physical address ADDR_1M issued for accessing the data piece $P_M'$ in the upper part of the lower memory rank Rank_1A before the data migration of the data piece $P_M'$ is started (i.e., ADDR_IN=ADDR_1M), the translation table 114 may not need to do any physical address translation, and therefore responds with the bypassed physical address ADDR_1M (i.e., ADDR_IN'=ADDR_1M). After the memory controller 104_1 receives the output physical address ADDR_IN', the memory controller 104_1 may access the data piece $P_M'$ in the upper part of the lower memory rank Rank_1A in response to the data access request issued from the external hardware module.

After the stored data in the lower part of the lower memory rank Rank_2A and stored data in the upper part of the lower memory rank Rank_1A are swapped, the memory device 102 may be controlled to operate like a single-channel memory, as shown in the sub-diagram (B) of FIG. 4. Both of the memory controllers DRAMC_1 and DRAMC_2 may remain active. However, the number of channels simultaneously active for data access may be reduced. In this way, the power consumption may be reduced correspondingly. As mentioned above, the latency resulting from the data access blockage depends on the data piece size. When the data piece size is set by a smaller value, the data access latency caused by the proposed data migration enabled for power saving may be less significant. When the data piece size is properly set, the objective of reducing power consumption of the memory device can be achieved without having a great impact on the user experience of using a computer system.

The data migration example shown in FIG. 5 is for illustrative purposes only. In an alternative design, the order of data pieces $P_1$-$P_M$ arranged in the lower part of the lower memory rank Rank_2A may be different from the order of data pieces $P_1$-$P_M$ arranged in the upper part of the lower memory rank Rank_1A, and/or the order of data pieces $P_1'$-$P_M'$ arranged in the upper part of the lower memory rank Rank_1A may be different from the order of data pieces $P_1'$-$P_M'$ arranged in the lower part of the lower memory rank Rank_2A.

In above examples, the data migration occurs between a cascade region and an interleaving region. However, these are for illustrative purposes only, and are not meant to be limitations of the present invention. In an alternative design, the data migration may occur between different parts in an interleaving region. In addition, after data migration of the stored data is accomplished, the memory device may be switched from a real full-interleaving mode to a pseudo full-interleaving mode. Further details are described as below.

Figure 6:
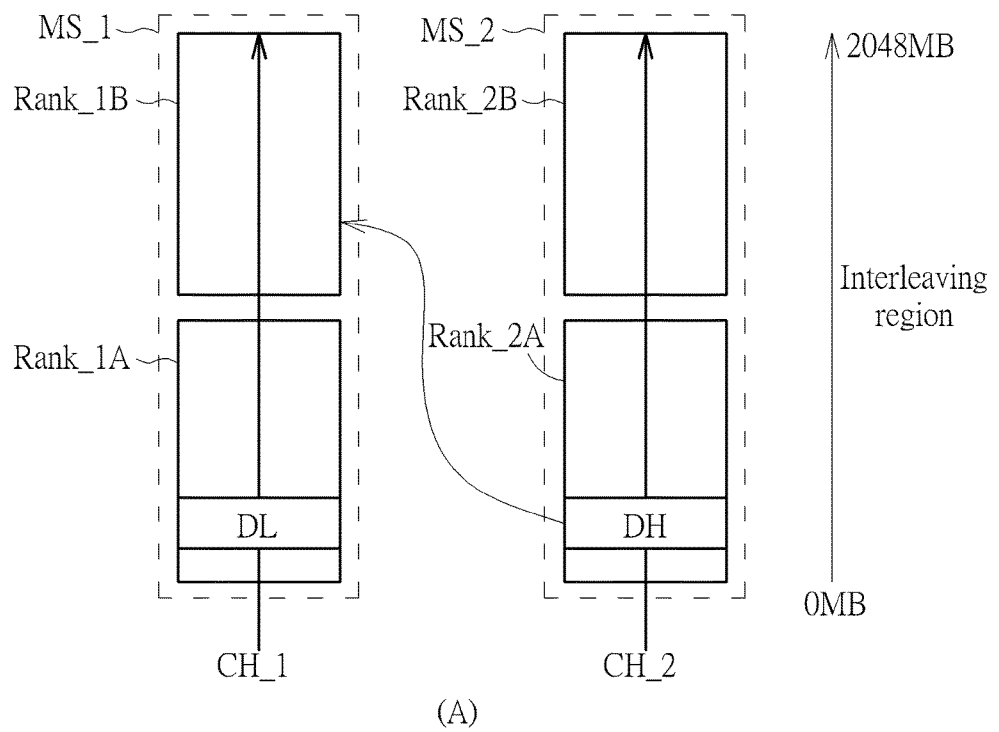
FIG. 6 is a diagram illustrating a data migration in a memory device according to a third embodiment of the present invention.
Figure 6:
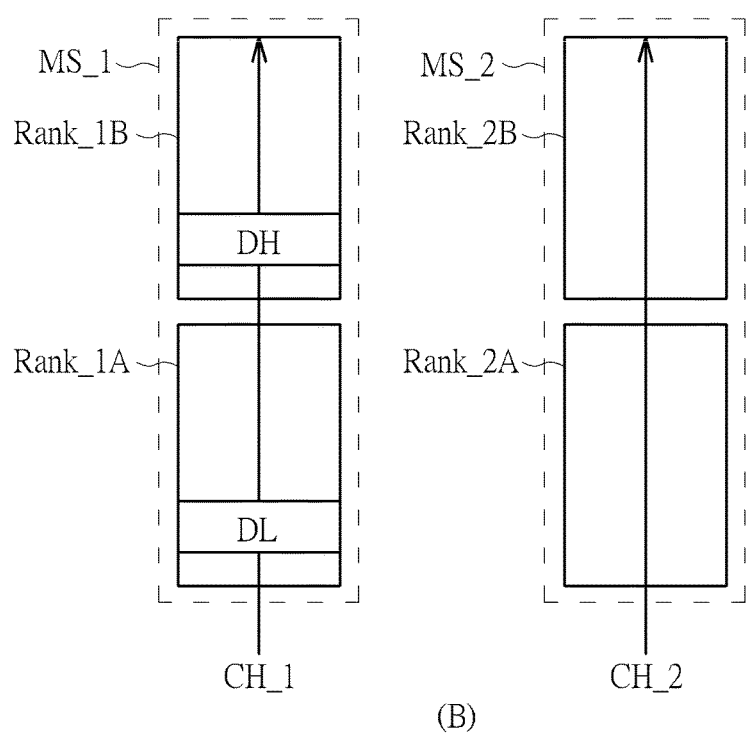

FIG. 6 is a diagram illustrating a data migration in a memory device according to a third embodiment of the present invention. Suppose that the memory device 102 may be a dual-channel memory. Hence, there may be two memory spaces 108_1-108_N (N=2) denoted by MS_1 and MS_2, and two memory channels 109_1-109_N (N=2) denoted by CH_1 and CH_2. In this example, the memory space MS_1 may have an upper memory rank Rank_1B and a lower memory rank Rank_1A, and the memory space MS_2 may have an upper memory rank Rank_2B and a lower memory rank Rank_2A. It should be noted that addresses assigned to an upper memory rank in a memory space may be higher than addresses assigned to a lower memory rank in the same memory space.

As shown in sub-diagram (A) of FIG. 6, the whole memory device 102 may be configured as an interleaving region. When the memory device 102 is used under a high power and higher bandwidth scenario, the memory device 102 may employ an interleaving memory access mode (e.g., real full-interleaving mode). Hence, one data chunk may be separated into a high data partition DH and a low data partition DL, where the high data partition DH and the low data partition DL may be submitted to different memory channels CH_1 and CH_2 to get maximum bandwidth. In this embodiment, the high data partition DH may be stored in the lower memory rank Rank_2A of the memory channel CH_2, and the low data partition DL may be stored in the lower memory rank Rank_1A of the memory channel CH_1.

When the computer system enters the suspend/standby mode or the memory device 102 is switched from the high power and higher bandwidth scenario to the low power and lower bandwidth scenario, the proposed data migration scheme may be enabled to transfer stored data from one memory space to another memory space for reducing the number of memory channels active at the same time. For example, the DMA controller 112 may transfer stored data, including the high data partition DH, in the lower memory rank Rank_2A to the upper memory rank Rank_1B, as shown in sub-diagram (B) of FIG. 6.

Hence, after the data migration of the stored data in the lower memory rank Rank_2A is performed under the control of the data migration control circuit 106, the high data partition DH and the low data partition DL of the same data chunk may be stored indifferent memory ranks Rank_1A and Rank_1B of the same memory channel CH_1. In this example, the memory device 102 may be controlled to operate like a single-channel memory since only one memory channel may be active at a time. Further, the memory device 102 may employ another interleaving memory access mode (e.g., pseudo full-interleaving mode) to simulate the original full-interleaving data transaction.

In a case where the data migration is the aforementioned copy/move operation and the memory space MS_2 has no valid data after the data migration is accomplished, both of the memory ranks Rank_2A and Rank_2B may enter the DPD state, and a memory controller 104_N (N=2) of the memory space MS_2 may be powered down. In another case where the data migration is the aforementioned swap operation, the number of channels simultaneously active for data access may be reduced due to the memory device 102 controlled to operate like a single-channel memory. The power consumption can be reduced in either case. Moreover, the user-aware migration latency can be mitigated or avoided by the proposed data piece based data migration scheme.

Figure 7:
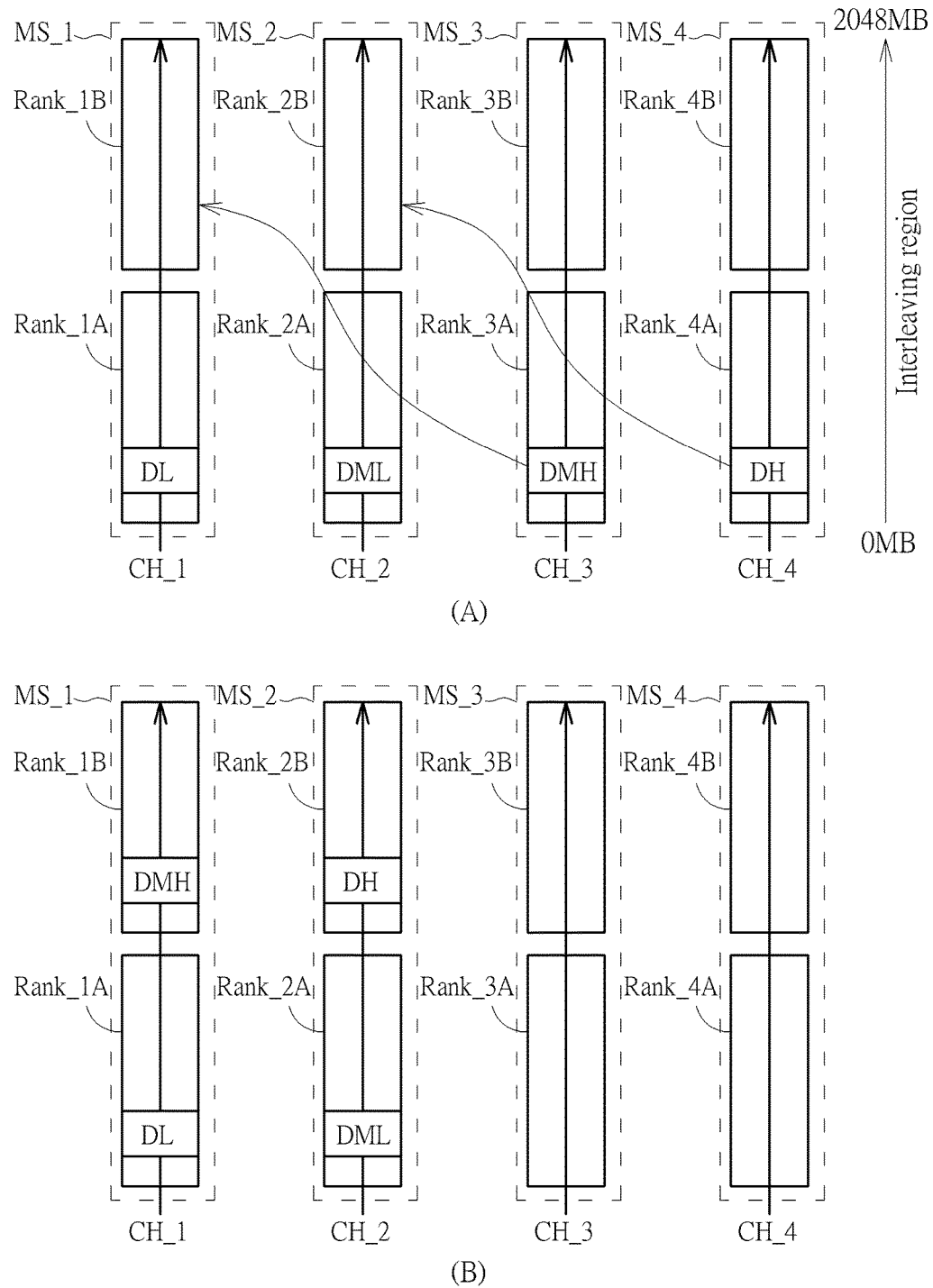
FIG. 7 is a diagram illustrating a data migration in a memory device according to a fourth embodiment of the present invention.

FIG. 7 is a diagram illustrating a data migration in a memory device according to a fourth embodiment of the present invention. Suppose that the memory device 102 may be a quad-channel memory. Hence, there may be four memory spaces 108_1-108_N (N=4) denoted by MS_1, MS_2, MS_3 and MS_4, and four memory channels 109_1-109_N (N=4) denoted by CH_1, CH_2, CH_3 and CH_4. In this example, the memory space MS_1 may have an upper memory rank Rank_1B and a lower memory rank Rank_1A, the memory space MS_2 may have an upper memory rank Rank_2B and a lower memory rank Rank_2A, the memory space MS_3 may have an upper memory rank Rank_3B and a lower memory rank Rank_3A, and the memory space MS_4 may have an upper memory rank Rank_4B and a lower memory rank Rank_4A. It should be noted that addresses assigned to an upper memory rank in a memory space are higher than addresses assigned to a lower memory rank in the same memory space.

As shown in sub-diagram (A) of FIG. 7, the whole memory device 102 may be configured as an interleaving region. When the memory device 102 is used under a high power and higher bandwidth scenario, the memory device 102 may employ an interleaving memory access mode (e.g., real full-interleaving mode). Hence, one data chunk may be separated into a high data partition DH, a medium-high data partition DMH, a medium-low data partition DML, and a low data partition DL, where the high data partition DH, the medium-high data partition DMH, the medium-low data partition DML and the low data partition DL may be submitted to different memory channels CH_1-CH_4 to get maximum bandwidth. In this embodiment, the high data partition DH may be stored in the lower memory rank Rank_4A of the memory channel CH_4, the medium-high data partition DMH may be stored in the lower memory rank Rank_3A of the memory channel CH_3, the medium-low data partition DML may be stored in the lower memory rank Rank_2A of the memory channel CH_2, and the low data partition DL may be stored in the lower memory rank Rank_1A of the memory channel CH_1.

When the computer system enters the suspend/standby mode or the memory device 102 is switched from the high power and higher bandwidth scenario to the low power and lower bandwidth scenario, the proposed data migration scheme may be enabled to transfer stored data from one memory space to another memory space. For example, the DMA controller 112 may transfer the stored data, including the high data partition DH, in the lower memory rank Rank_4A to the upper memory rank Rank_2B and transfer the stored data, including the medium-high data partition DMH, in the lower memory rank Rank_3A to the upper memory rank Rank_1B, as shown in sub-diagram (B) of FIG. 7. Hence, the high data partition DH and the medium-low data partition DML of the same data chunk may be stored in different memory ranks Rank_2B and Rank_2A of the same memory channel CH_2, and the medium-high data partition DMH and the low data partition DL of the same data chunk may be stored in different memory ranks Rank_1B and Rank_1A of the same memory channel CH_1. In this example, the memory device 102 may be controlled to operate like a dual-channel memory since only two memory channels may be active at a time. Further, the memory device 102 may employ another interleaving memory access mode (e.g., pseudo-full-interleaving mode) to simulate the original full-interleaving data transaction.

In a case where the data migration is the aforementioned copy/move operation and the memory spaces MS_3 and MS_4 have no valid data after the data migration is accomplished, all of the memory ranks Rank_3A, Rank_3B, Rank_4A, Rank_4B may enter the DPD state, and associated memory controllers 104_N−1 and 104_N (N=4) of the memory spaces MS_3 and MS_4 may be powered down. In another case where the data migration is the aforementioned swap operation, the number of channels simultaneously active for data access may be reduced due to the memory device 102 controlled to operate like a dual-channel memory. The power consumption can be reduced in either case. Moreover, the user-aware migration latency can be mitigated or avoided by the proposed data piece based data migration scheme.

Figure 8:
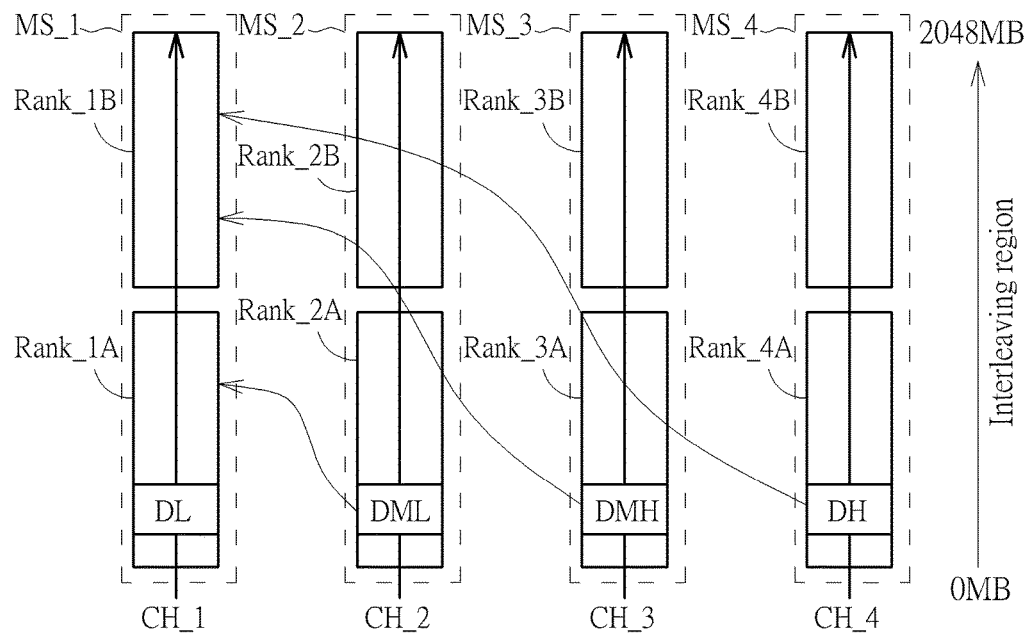
FIG. 8 is a diagram illustrating a data migration in a memory device according to a fifth embodiment of the present invention.
Figure 8:
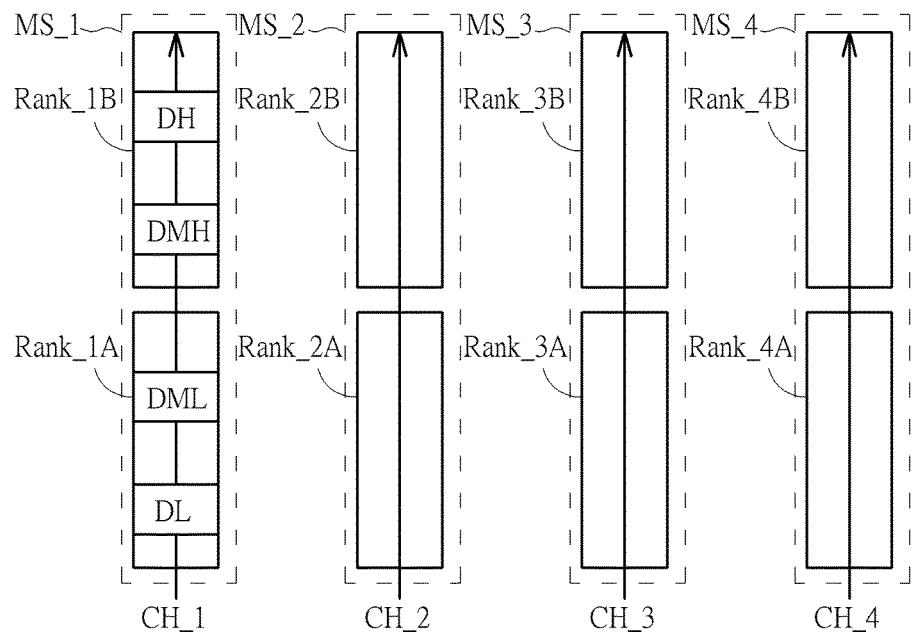

FIG. 8 is a diagram illustrating a data migration in a memory device according to a fifth embodiment of the present invention. Suppose that the memory device 102 may be a quad-channel memory. Hence, there may be four memory spaces 108_1-108_N (N=4) denoted by MS_1, MS_2, MS_3 and MS_4 and four memory channels 109_1-109_N (N=4) denoted by CH_1, CH_2, CH_3 and CH_4. The major difference between the data migration operations shown in FIG. 7 and FIG. 8 is that the memory device 102 may be controlled to operate like a single-channel memory after the data migration operation shown in FIG. 8 is accomplished.

When the memory device 102 is used under a high power and higher bandwidth scenario, the memory device 102 may employ an interleaving memory access mode (e.g., real-full-interleaving mode). As shown in sub-diagram (A) of FIG. 8, the high data partition DH, the medium-high data partition DMH, the medium-low data partition DML and the low data partition DL may be submitted to different memory channels CH_1-CH_4 to get maximum bandwidth.

When the computer system enters the suspend/standby mode or the memory device 102 is switched from the high power and higher bandwidth scenario to the low power and lower bandwidth scenario, the proposed data migration scheme may be enabled to transfer stored data from one memory space to another memory space. For example, the DMA controller 112 may transfer the stored data, including the high data partition DH, in the lower memory rank Rank_4A to an upper part of the upper memory rank Rank_1B, transfer the stored data, including the medium-high data partition DMH, in the lower memory rank Rank_3A to a lower part of the upper memory rank Rank_1B, and transfer the stored data, including the medium-low data partition DML, in the lower memory rank Rank_2A to an upper part of the lower memory rank Rank_1A. As shown in sub-diagram (B) of FIG. 8, the high data partition DH and the medium-high data partition DMH of the same data chunk may be both stored in the one memory rank Rank_1B of the memory channel CH_1, and the medium-low data partition DML and the low data partition DL may be both stored in another memory rank Rank_1A of the same memory channel CH_1. In this embodiment, the memory device 102 may be controlled to operate like a single-channel memory since only one memory channel may be active at a time. In addition, the memory device 102 may employ another interleaving memory access mode (e.g., pseudo full-interleaving mode) to simulate the original full-interleaving data transaction.

In a case where the data migration is the aforementioned copy/move operation and the memory spaces MS_2, MS_3 and MS_4 have no valid data after the data migration is accomplished, all of the memory ranks Rank_2A, Rank_2B, Rank_3A, Rank_3B, Rank_4A, Rank_4B may enter the DPD state, and associated memory controllers 104N-2, 104_N−1 and 104_N (N=4) of the memory spaces MS_2, MS_3 and MS_4 may be powered down. In another case where the data migration is the aforementioned swap operation, the number of channels simultaneously active for data access may be reduced due to the memory device 102 controlled to operate like a single-channel memory. The power consumption can be reduced in either case. Moreover, the user-aware migration latency can be mitigated or avoided by the proposed data piece based data migration scheme.

As mentioned above, the translation table 114 may postpone address translation of a received physical address issued from an external hardware module when the received physical address is to request a data piece currently being migrated from one memory space to another memory space. Alternatively, a migration pointer may be used to control data access of data pieces requested during data migration of stored data from one memory space to another memory space. Further details are described as below.

Figure 9:
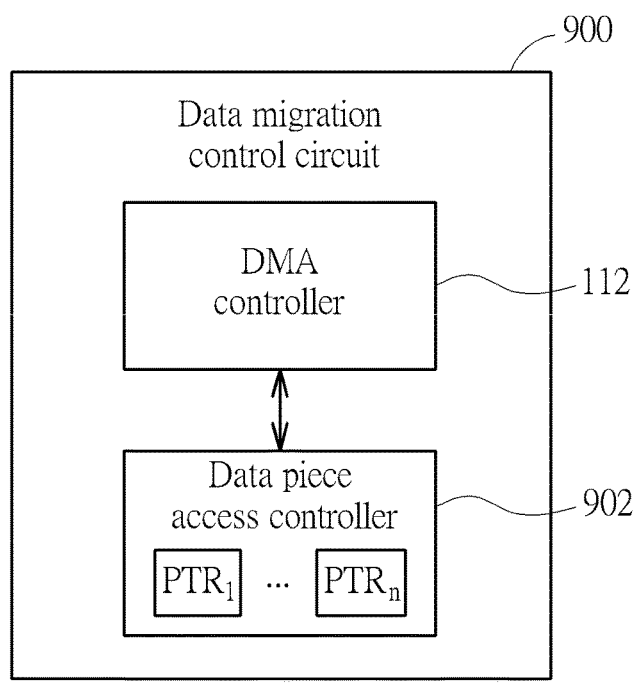
FIG. 9 is a diagram illustrating a different design of a data migration control circuit according to an embodiment of the present invention.

FIG. 9 is a diagram illustrating a different design of a data migration control circuit according to an embodiment of the present invention. The data migration control circuit 106 shown in FIG. 1 may be replaced with the data migration control circuit 900 shown in FIG. 9. In this embodiment, the data migration control circuit 900 may include a data piece access controller 902 and the aforementioned DMA controller 112. As mentioned above, the DMA controller 112 may divide stored data into a plurality of data pieces, and transfer the data pieces from one memory space to another memory space through a DMA manner. With regard to the data piece access controller 902, it may store one migration pointer $PTR_1$ or multiple migration pointers $PTR_1$-$PTR_n$, wherein each migration pointer may be maintained by the DMA controller 112 for indicating a location of a migration zone in a memory space to which one data piece is currently being migrated (or from which one data piece is currently being migrated). In other words, when the DMA controller 112 finishes data migration of the current data piece, the DMA controller 112 may instruct the data piece access controller 902 to update a migration pointer before data migration of the next data piece is started. It should be noted that the number of migration pointers $PTR_1$-$PTR_n$ may depend on the number of memory channels and the data migration scheme employed by the DMA controller 112.

By way of example, but not limitation, a migration pointer may indicate a current DMA location where the DMA controller 112 is currently working upon, and the size of a migration zone associated with the current DMA location may be equal to a DMA unit size (e.g., a data piece size). Hence, the data piece access controller 902 may be configured to check a migration pointer (e.g., $PTR_1$) to determine if a requested data piece is a data piece currently being migrated to (or migrated from) a migration zone pointed to by the migration pointer. When determining that the requested data piece is the data piece currently being migrated to (or migrated from) the migration zone, the data piece access controller 902 may block data access of the requested data piece until the requested data piece is fully stored into (of fully copied/moved from) the migration zone.

Figure 10:
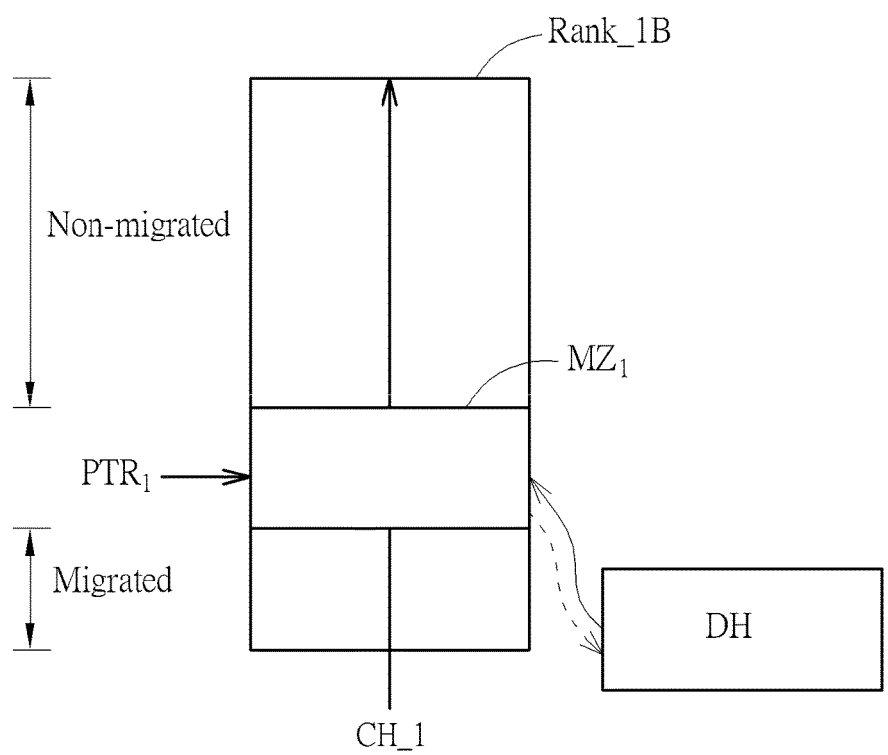
FIG. 10 is a diagram illustrating one migration pointer based data access control scheme used during data migration of stored data from one memory space to another memory space according to an embodiment of the present invention.

FIG. 10 is a diagram illustrating one migration pointer based data access control scheme used during data migration of stored data from one memory space to another memory space according to an embodiment of the present invention. With regard to the exemplary data migration operation shown in FIG. 6, the DMA controller 112 may maintain one migration pointer $PTR_1$ in the data piece access controller 902 to indicate which data piece has been already migrated and which data piece is not migrated yet. In this embodiment, data pieces of the stored data in the lower memory rank Rank_2A may be sequentially migrated to the upper memory rank Rank_1B and sequentially stored in the upper memory rank Rank_1B. That is, concerning any two consecutive data pieces in the lower memory rank Rank_2A, a first data piece with a first piece address in the lower memory rank Rank_2A is migrated before a second data piece with a second piece address in the lower memory rank Rank_2A, where the first piece address and the second piece address may be adjacent piece addresses in the lower memory rank Rank_2A. For example, the first piece address may be lower than the second piece address. Further, the first data piece may be migrated to a third piece address in the upper memory rank Rank_1B, and the second data piece may be migrated to a fourth piece address in the upper memory rank Rank_1B, where the third piece address and the fourth piece address may be adjacent piece addresses in the upper memory rank Rank_1B. For example, the third piece address may be lower than the fourth piece address. To avoid racing condition between the DMA controller 112 and the external hardware module, a migration zone $MZ_1$ pointed to by the migration pointer $PTR_1$ may define a small region where the DMA controller 112 is working upon.

As shown in FIG. 10, when the DMA controller 112 is transferring a data piece (e.g., high data partition DH shown in FIG. 6), the DMA controller 112 may update the migration pointer $PTR_1$ to properly define the migration zone $MZ_1$. Hence, the data piece access controller 902 may refer to the migration pointer $PTR_1$ to know the address range of the migration zone $MZ_1$. Since data pieces of the stored data in the lower memory rank Rank_2A may be sequentially migrated to the upper memory rank Rank_1B and sequentially stored in the upper memory rank Rank_1B, the memory region above the migration zone $MZ_1$ may not have the migrated data pieces stored therein, and the memory region below the migration zone $MZ_1$ may already have migrated data pieces stored therein.

In a case where the external hardware module requests data already migrated to the memory region below the migration zone $MZ_1$, the data piece access controller 902 may not block the data access of the requested data, such that the requested data can be instantly accessed in the memory region below the migration zone $MZ_1$. In another case where the external hardware module requests data not yet migrated to the memory region above the migration zone $MZ_1$, the data piece access controller 902 may not block the data access of the requested data, such that the requested data can be instantly accessed in the lower memory rank Rank_2A. In yet another case where the external hardware module requests data currently being migrated to the migration zone $MZ_1$, the data piece access controller 902 may block the data access of the requested data until the current data piece (e.g., high data partition DH) is fully stored into the migration zone $MZ_1$.

In this embodiment, the migration zone $MZ_1$ may be defined in a migration destination. For example, when data pieces of the stored data in the lower memory rank Rank_2A may be sequentially migrated to the upper memory rank Rank_1B and sequentially stored in the upper memory rank Rank_1B, the migration zone $MZ_1$ pointed to by the migration pointer $PTR_1$ in FIG. 10 may be defined in the migration destination (i.e., upper memory rank Rank_1B).

In an alternative embodiment, the migration zone $MZ_1$ may be defined in a migration source. For example, when data pieces of the stored data in the upper memory rank Rank_1B may be sequentially migrated to the lower memory rank Rank_1A and sequentially stored in the lower memory rank Rank_1A, the migration zone $MZ_1$ pointed to by the migration pointer $PTR_1$ in FIG. 10 may be defined in the migration source (i.e., upper memory rank Rank_1B). The same objective of using the migration zone $MZ_1$ to avoid racing condition between the DMA controller 112 and the external hardware module is achieved.

Figure 11:
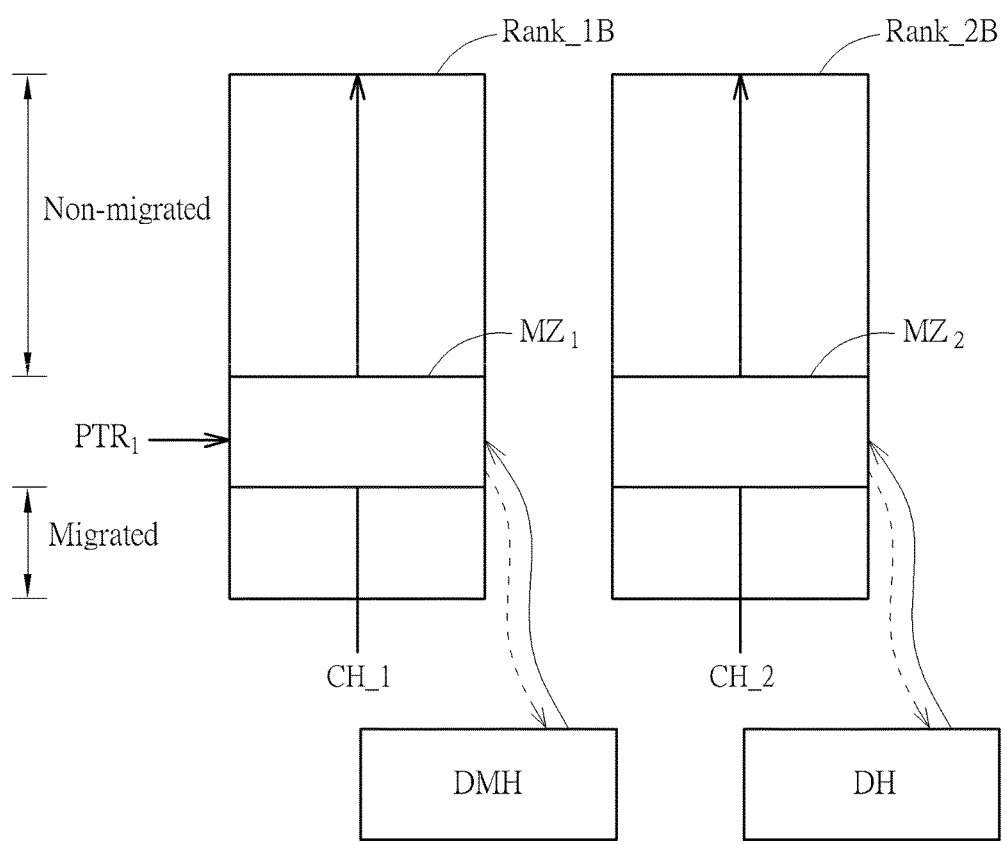
FIG. 11 is a diagram illustrating another migration pointer based data access control scheme used during data migration of stored data from one memory space to another memory space according to an embodiment of the present invention.

Please refer to FIG. 11 in conjunction with FIG. 7. FIG. 11 is a diagram illustrating another migration pointer based data access control scheme used during data migration of stored data from one memory space to another memory space according to an embodiment of the present invention. With regard to the exemplary data migration operation shown in FIG. 7, the DMA controller 112 may maintain one migration pointer $PTR_1$ in the data piece access controller 902 to indicate which data piece has been already migrated and which data piece is not migrated yet. In this embodiment, data pieces of the stored data in the lower memory rank Rank_3A may be sequentially migrated to the upper memory rank Rank_1B and sequentially stored in the upper memory rank Rank_1B; and data pieces of the stored data in the lower memory rank Rank_4A may be sequentially migrated to the upper memory rank Rank_2B and sequentially stored in the upper memory rank Rank_2B. Similarly, to avoid racing condition between the DMA controller 112 and the external hardware module (e.g., MMU), a migration zone $MZ_1$ pointed to by the migration pointer $PTR_1$ may define a small region in upper memory rank Rank_1B where the DMA controller 112 is working upon, and a migration zone $MZ_2$ also pointed to by the migration pointer $PTR_1$ may define a small region in upper memory rank Rank_2B where the DMA controller 112 is working upon.

As shown in FIG. 11, when the DMA controller 112 is transferring data pieces (e.g., medium-high data partition DMH and high data partition DH), the DMA controller 112 may update the migration pointer $PTR_1$ to properly define the migration zones $MZ_1$ and $MZ_2$ in respective memory ranks Rank_1B and Rank_2B. Hence, the data piece access controller 902 may refer to the migration pointer $PTR_1$ to know the address range of each of the migration zones $MZ_1$ and $MZ_2$. Since data pieces of the stored data in the lower memory rank Rank_3A may be sequentially migrated to the upper memory rank Rank_1B and sequentially stored in the upper memory rank Rank_1B and data pieces of the stored data in the lower memory rank Rank_4A may be sequentially migrated to the upper memory rank Rank_2B and sequentially stored in the upper memory rank Rank_2B, the memory region above the migration zone $MZ_1$ and the memory region above the migration zone $MZ_2$ do not have the migrated data pieces stored therein, and the memory region below the migration zone $MZ_1$ and the memory region below the migration zone $MZ_2$ already have migrated data pieces stored therein.

In a case where the external hardware module requests data already migrated to the memory region below the migration zone $MZ_1/MZ_2$ the data piece access controller 902 may not block the data access of the requested data, such that the requested data can be instantly accessed in the memory region below the migration zone $MZ_1/MZ_2$. In another case where the external hardware module requests data not yet migrated to the memory region above the migration zone $MZ_1/MZ_2$, the data piece access controller 902 may not block the data access of the requested data, such that the requested data can be instantly accessed in the lower memory rank Rank_3A/Rank_4A. In yet another case where the external hardware module requests data currently being migrated to the migration zone $MZ_1/MZ_2$, the data piece access controller 902 may block the data access of the requested data until the current data piece DMH/DH is fully stored into the migration zone $MZ_1/MZ_2$.

In this embodiment, the migration zones $MZ_1$ and $MZ_2$ may be defined in migration destinations. For example, when data pieces of the stored data in the lower memory rank Rank_3A may be sequentially migrated to the upper memory rank Rank_1B and sequentially stored in the upper memory rank Rank_1B, and data pieces of the stored data in the lower memory rank Rank_4A may be sequentially migrated to the upper memory rank Rank_2B and sequentially stored in the upper memory rank Rank_2B, the migration zones $MZ_1$ and $MZ_2$ pointed to by the migration pointer $PTR_1$ in FIG. 11 may be defined in the migration destination (i.e., upper memory ranks Rank_1B and Rank_2B).

In an alternative embodiment, the migration zones $MZ_1$ and $MZ_2$ may be defined in migration sources. For example, when data pieces of the stored data in the upper memory rank Rank_1B may be sequentially migrated to the lower memory rank Rank_3A and sequentially stored in the lower memory rank Rank_3A, and data pieces of the stored data in the upper memory rank Rank_2B may be sequentially migrated to the lower memory rank Rank_4A and sequentially stored in the lower memory rank Rank_4A, the migration zones $MZ_1$ and $MZ_2$ pointed to by the migration pointer $PTR_1$ in FIG. 11 may be defined in the migration sources (i.e., upper memory ranks Rank_1B and Rank_2B). The same objective of using the migration zones $MZ_1$ and $MZ_2$ to avoid racing condition between the DMA controller 112 and the external hardware module is achieved.

Figure 12:
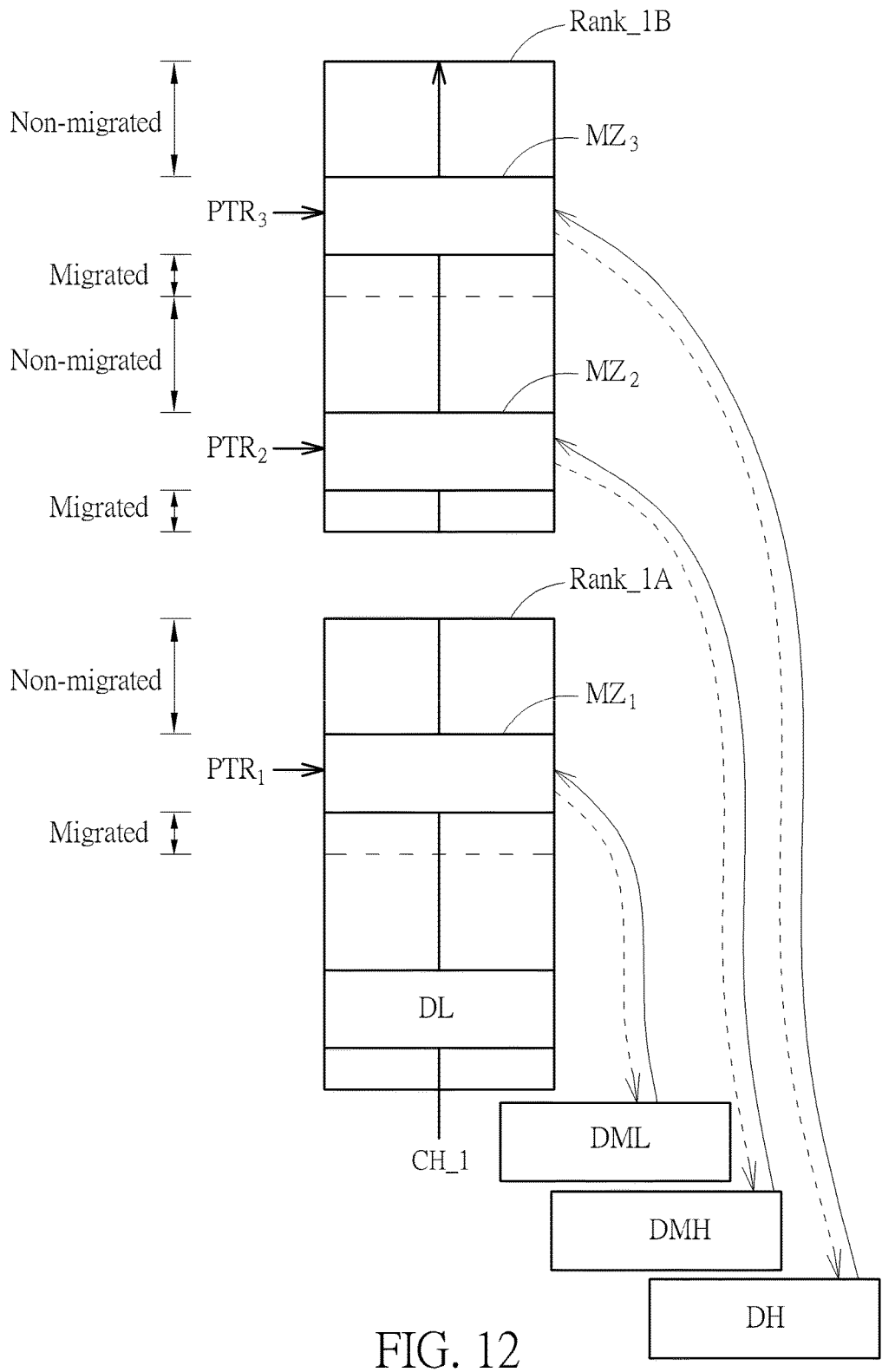
FIG. 12 is a diagram illustrating yet another migration pointer based data access control scheme used during data migration of stored data from one memory space to another memory space according to an embodiment of the present invention.

Please refer to FIG. 12 in conjunction with FIG. 8. FIG. 12 is a diagram illustrating yet another migration pointer based data access control scheme used during data migration of stored data from one memory space to another memory space according to an embodiment of the present invention. With regard to the exemplary data migration shown in FIG. 8, the DMA controller 112 may maintain multiple migration pointers $PTR_1$, $PTR_2$ and $PTR_3$ in the data piece access controller 902 to indicate which data piece has been already migrated and which data piece is not migrated yet. In this embodiment, data pieces of the stored data in the lower part of the lower memory rank Rank_2A may be sequentially migrated to the upper part of the lower memory rank Rank_1A and sequentially stored in the upper part of the lower memory rank Rank_1A; data pieces of the stored data in the lower part of the lower memory rank Rank_3A may be sequentially migrated to the lower part of the upper memory rank Rank_1B and sequentially stored in the lower part of the upper memory rank Rank_1B; and data pieces of the stored data in the lower part of the lower memory rank Rank_4A may be sequentially migrated to the upper part of the upper memory rank Rank_1B and sequentially stored in the upper part of the upper memory rank Rank_1B. Similarly, to avoid racing condition between the DMA controller 112 and the external hardware module, a migration zone $MZ_1$ pointed to by the migration pointer $PTR_1$ may define a small region in upper part of lower memory rank Rank_1A where the DMA controller 112 is working upon, a migration zone $MZ_2$ pointed to by the migration pointer $PTR_2$ may define a small region in lower part of upper memory rank Rank_1B where the DMA controller 112 is working upon, and a migration zone $MZ_3$ pointed to by the migration pointer $PTR_3$ may define a small region in upper part of upper memory rank Rank_1B where the DMA controller 112 is working upon.

As shown in FIG. 12, when the DMA controller 112 is transferring data pieces (e.g., medium-low data partition DML, medium-high data partition DMH and high data partition DH), the DMA controller 112 may update the migration pointers $PTR_1$-$PTR_3$ to properly define the migration zones $MZ_1$-$MZ_3$ in memory ranks Rank_1B and Rank_1A. Hence, the data piece access controller 902 may refer to the migration pointers $PTR_1$-$PTR_3$ to know the address range of each of the migration zones $MZ_1$-$MZ_3$, and control data access of requested data.

In this embodiment, the migration zones $MZ_1$-$MZ_3$ may be defined in migration destinations. For example, when data pieces of the stored data in the lower part of the lower memory rank Rank_2A may be sequentially migrated to the upper part of the lower memory rank Rank_1A and sequentially stored in the upper part of the lower memory rank Rank_1A, data pieces of the stored data in the lower part of the lower memory rank Rank_3A may be sequentially migrated to the lower part of the upper memory rank Rank_1B and sequentially stored in the lower part of the upper memory rank Rank_1B, and data pieces of the stored data in the lower part of the lower memory rank Rank_4A may be sequentially migrated to the upper part of the upper memory rank Rank_1B and sequentially stored in the upper part of the upper memory rank Rank_1B, the migration zones $MZ_1$-$MZ_3$ pointed to by the migration pointers $PTR_1$-$PTR_3$ in FIG. 12 may be defined in the migration destinations (i.e., upper memory rank Rank_1B and lower memory rank Rank_1A).

In an alternative embodiment, the migration zones $MZ_1$-$MZ_3$ may be defined in migration sources. For example, when data pieces of the stored data in the upper part of the lower memory rank Rank_1A may be sequentially migrated to the lower part of the lower memory rank Rank_2A and sequentially stored in the lower part of the lower memory rank Rank_2A, data pieces of the stored data in the lower part of the upper memory rank Rank_1B may be sequentially migrated to the lower part of the lower memory rank Rank_3A and sequentially stored in the lower part of the lower memory rank Rank_3A, and data pieces of the stored data in the upper part of the upper memory rank Rank_1B may be sequentially migrated to the lower part of the lower memory rank Rank_4A and sequentially stored in the lower part of the lower memory rank Rank_4A, the migration zones $MZ_1$-$MZ_3$ pointed to by the migration pointers $PTR_1$-$PTR_3$ in FIG. 12 may be defined in the migration sources (i.e., upper memory rank Rank_1B and lower memory rank Rank_1A). The same objective of using the migration zones $MZ_1$-$MZ_3$ to avoid racing condition between the DMA controller 112 and the external hardware module is achieved.

As a person skilled in the art can readily understand details of the data access control performed by the data piece access controller 902 after reading above paragraphs directed to the examples shown in FIG. 10 and FIG. 11, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory system comprising:
a memory device, comprising a plurality of memory spaces accessed via a plurality of memory channels, respectively; and
a data migration control circuit, configured to control a first stored data in a second memory space of the memory spaces to migrate to a first memory space of the memory spaces, the data migration control circuit comprising:
a direct memory access (DMA) controller, configured to divide the first stored data into a plurality of data pieces, and further configured to transfer the data pieces from the second memory space to the first memory space; and
a translation table, configured to record mapping between original addresses of the data pieces in the second memory space and new addresses of the data pieces in the first memory space,
wherein when a first data piece of the first stored data is requested during data migration of the first data piece, the data migration control circuit is further configured to block data access of the first data piece until the first data piece is fully stored into the first memory space,
wherein a size of the first data piece is smaller than a size of the first stored data, and
wherein, when receiving a physical address of the first data piece in the second memory space during the data migration of the first data piece, the translation table performs translation of the physical address of the first data piece in the second memory space to a physical address of the first data piece in the first memory space after the first data piece is fully stored into the first memory space.

2. The memory system of claim 1, wherein the data migration control circuit is configured to swap the first stored data in the second memory space and a second stored data in the first memory space, wherein when a second data piece of the second stored data is requested during data migration of the second data piece from the first memory space to the second memory space, the data migration control circuit is further configured to block data access of the second data piece until the second data piece is fully stored into the second memory space, and where a size of the second data piece is smaller than a size of the second stored data.

3. The memory system of claim 1, wherein each of the first memory space and the second memory space includes a first memory rank and a second memory rank, wherein memory addresses assigned to the first memory rank are lower than memory addresses assigned to the second memory rank, and wherein the data migration control circuit is configured to control the first stored data to migrate from the first memory rank of the second memory space to the first memory rank of the first memory space.

4. The memory system of claim 3, wherein the first memory rank of the first memory space further has a second stored data and wherein before data migration of the first stored data is performed, the first stored data and the second stored data are stored into the second memory space and the first memory space under a cascade memory access mode.

5. The memory system of claim 3, wherein the first memory rank of the first memory space further has a second stored data, and wherein before data migration of the first stored data is performed, the first stored data and the second stored data are stored into the second memory space and the first memory space under an interleaving memory access mode.

6. The memory system of claim 1, wherein each of the first memory space and the second memory space includes a first memory rank and a second memory rank, wherein memory addresses assigned to the first memory rank are lower than memory addresses assigned to the second memory rank and wherein the data migration control circuit is configured to control the first stored data to migrate from the first memory rank of the second memory space to the second memory rank of the first memory space.

7. The memory system of claim 6, wherein the first memory rank of the first memory space further has a second stored data, and wherein before data migration of the first stored data is performed, the first stored data and the second stored data are stored into the second memory space and the first memory space under an interleaving memory access mode.

8. The memory system of claim 1, wherein the data migration control circuit further comprises:
a data piece access controller, configured to store at least a migration pointer,
wherein the migration pointer is maintained by the DMA controller for indicating a location of a migration zone where the DMA controller is currently working upon, and
wherein the migration zone is defined in at least one of the first memory space and the second memory space.

9. The memory system of claim 8, wherein the migration zone is defined in the first memory space, wherein the data piece access controller is further configured to check the migration pointer to determine if the requested first data piece is currently being migrated to the migration zone pointed to by the migration pointer, and wherein when determining that the first data piece is currently being migrated to the migration zone, the data piece access controller is further configured to block data access of the first data piece until the first data piece is fully stored into the migration zone.

10. The memory system of claim 8, wherein the migration zone is defined in the second memory space, wherein the data piece access controller is further configured to check the migration pointer to determine if the requested first data piece is currently being migrated from the migration zone pointed to by the migration pointer, and wherein when determining that the first data piece is currently being migrated from the migration zone, the data piece access controller is further configured to block data access of the first data piece until the first data piece is fully copied or moved from the migration zone.

11. A method for managing a memory device comprising a plurality of memory spaces accessed via a plurality of memory channels, respectively, the method comprising:
controlling a first stored data in a second memory space of the memory spaces to migrate to a first memory space of the memory spaces;
when a first data piece of the first stored data is requested during data migration of the first data piece, blocking data access of the first data piece until the first data piece is fully stored into the first memory space; and
utilizing a translation table to record mapping between original addresses of the data pieces in the second memory space and new addresses of the data pieces in the first memory space,
wherein a size of the first data piece is smaller than a size of the first stored data,
wherein controlling the first stored data in the second memory space of the memory spaces to migrate to the first memory space of the memory spaces comprises:
dividing the first stored data into a plurality of data pieces; and
transferring the data pieces from the second memory space to the first memory space through direct memory access (DMA),
wherein blocking the data access of the first data piece comprises, when receiving a physical address of the first data piece in the second memory space during the data migration of the first data piece, blocking the translation table from translating the physical address of the first data piece in the second memory space to a physical address of the first data piece in the first memory space until the first data piece is fully stored into the first memory space.

12. The method of claim 11, wherein controlling the first stored data in the second memory space of the memory spaces to migrate to the first memory space of the memory spaces comprises swapping the first stored data in the second memory space and a second stored data in the first memory space, and wherein the method further comprises when a second data piece of the second stored data is requested during data migration of the second data piece from the first memory space to the second memory space, blocking data access of the second data piece until the second data piece is fully stored into the second memory space, where a size of the second data piece is smaller than a size of the second stored data.

13. The method of claim 11, wherein each of the first memory space and the second memory space includes a first memory rank and a second memory rank, wherein memory addresses assigned to the first memory rank are lower than memory addresses assigned to the second memory rank, and wherein controlling the first stored data in the second memory space of the memory spaces to migrate to the first memory space of the memory spaces comprises controlling the first stored data to migrate from the first memory rank of the second memory space to the first memory rank of the first memory space.

14. The method of claim 13, wherein the first memory rank of the first memory space further has a second stored data, and wherein the method further comprises, before the data migration of the first stored data is performed, storing the first stored data and the second stored data into the second memory space and the first memory space under a cascade memory access mode.

15. The method of claim 13, wherein the first memory rank of the first memory space further has a second stored data, and wherein the method further comprises, before data migration of the first stored data is performed, storing the first stored data and the second stored data into the second memory space and the first memory space under an interleaving memory access mode.

16. The method of claim 11, wherein each of the first memory space and the second memory space includes a first memory rank and a second memory rank, wherein memory addresses assigned to the first memory rank are lower than memory addresses assigned to the second memory rank, and wherein controlling the first stored data in the second memory space of the memory spaces to migrate to the first memory space of the memory spaces comprises controlling the first stored data to migrate from the first memory rank of the second memory space to the second memory rank of the first memory space.

17. The method of claim 16, wherein the first memory rank of the first memory space further has a second stored data, and wherein the method further comprises, before data migration of the first stored data is performed, storing the first stored data and the second stored data into the second memory space and the first memory space under an interleaving memory access mode.

18. The method of claim 11, further comprising:
storing at least a migration pointer maintained for indicating a location of a migration zone where the DMA is currently working upon,
wherein the migration zone is defined in at least one of the first memory space and the second memory space.

19. The method of claim 18, wherein the migration zone is defined in the first memory space, and wherein blocking the data access of the first data piece comprises:
checking the migration pointer to determine if the requested first data piece is currently being migrated to the migration zone pointed to by the migration pointer; and
when determining that the first data piece is currently being migrated to the migration zone, blocking data access of the first data piece until the first data piece is fully stored into the migration zone.

20. The method of claim 18, wherein the migration zone is defined in the second memory space, and blocking the data access of the first data piece comprises:
checking the migration pointer to determine if the requested first data piece is currently being migrated from the migration zone pointed to by the migration pointer; and
when determining that the first data piece is currently being migrated from the migration zone, blocking data access of the first data piece until the first data piece is fully copied or moved from the migration zone.

* * * * *